US006927699B2

(12) United States Patent
Samukawa et al.

(10) Patent No.: US 6,927,699 B2
(45) Date of Patent: Aug. 9, 2005

(54) OBJECT RECOGNITION APPARATUS FOR VEHICLE, AND INTER-VEHICLE DISTANCE CONTROL UNIT

(75) Inventors: Yoshie Samukawa, Kariya (JP); Keiji Matsuoka, Kariya (JP); Toyohito Nozawa, Kariya (JP); Hiroshi Ohkata, Kariya (JP)

(73) Assignee: Denso Corporation, Kariya (JP)

( * ) Notice: Subject to any disclaimer, the term of this patent is extended or adjusted under 35 U.S.C. 154(b) by 31 days.

(21) Appl. No.: 10/716,795

(22) Filed: Nov. 20, 2003

(65) Prior Publication Data

US 2004/0117090 A1 Jun. 17, 2004

(30) Foreign Application Priority Data

Dec. 5, 2002 (JP) ........................................ 2002-354215
Dec. 19, 2002 (JP) ........................................ 2002-368904

(51) Int. Cl.[7] ................................................ G08G 1/16
(52) U.S. Cl. ........................ 340/903; 340/435; 340/436; 342/70; 701/96; 180/169
(58) Field of Search .................................. 340/903, 435, 340/436; 701/45, 93, 96, 201; 342/70; 180/168, 169

(56) References Cited

U.S. PATENT DOCUMENTS

| | | | |
|---|---|---|---|
| 5,529,138 A | * | 6/1996 | Shaw et al. .................. 180/169 |
| 5,710,565 A | | 1/1998 | Shirai et al. |
| 5,731,779 A | | 3/1998 | Kikuchi ........................ 342/70 |
| 6,025,797 A | | 2/2000 | Kawai et al. |
| 6,061,001 A | | 5/2000 | Sugimoto ..................... 340/903 |
| 6,311,121 B1 | * | 10/2001 | Kuragaki et al. .............. 701/96 |
| 6,567,737 B2 | * | 5/2003 | Nakamura et al. ............. 701/96 |
| 6,597,307 B2 | | 7/2003 | Nakanishi et al. ............. 342/70 |
| 2002/0189875 A1 | | 12/2002 | Asanuma et al. ............ 180/169 |
| 2004/0065814 A1 | | 4/2004 | Miyazaki et al. ......... 250/222.1 |

FOREIGN PATENT DOCUMENTS

| | | |
|---|---|---|
| JP | 8-279099 | 10/1996 |
| JP | A-09-178856 | 7/1997 |
| JP | 11-94943 | 4/1999 |
| JP | A-2000-56020 | 2/2000 |
| JP | A-2001-21646 | 1/2001 |
| JP | 2002-40139 | 2/2002 |
| JP | A-2002-174684 | 6/2002 |
| JP | A-2002-202360 | 7/2002 |
| JP | 2002-257926 | 9/2002 |
| JP | A-2003-107159 | 4/2003 |
| JP | A-2004-125739 | 4/2004 |

* cited by examiner

*Primary Examiner*—Anh V. La
(74) *Attorney, Agent, or Firm*—Posz Law Group, PLC

(57) ABSTRACT

In an object recognition apparatus using a radar unit for a vehicle, in mounting the radar unit on the vehicle, a transmission wave is outputted throughout an appropriate angular range in a forward direction of the vehicle in a state where a margin is given to a tolerance of the mounting angle of the radar unit on the vehicle. Laser beams are radiated at a target placed at a predetermined positional relationship relative to the radar unit mounted on the vehicle to extract a laser beam which provides the maximum light-reception intensity in each of the X-axis and Y-axis directions. Moreover, a predetermined angular range is set in each of the X-axis and Y-axis directions so that the laser beam which provides the maximum light-reception intensity is centered therein, and the predetermined angular range is used as a recognition area.

19 Claims, 19 Drawing Sheets

| Mark | Area | Conditions | Instantaneous Probability Pi (%) |
|---|---|---|---|
| ① | d | having area even if only slightly | 100 |
| ② | a | center exists in area | 80 |
| ③ | b | center exists in area | 60 |
| ④ | c | center exists in area | 30 |
| ⑤ | e | center exists in area | 10 |
| ⑥ | | not satisfying all conditions 1 to 5 | 0 |

HIGH ↑ PRIORITY ↓ LOW

FIG. 25

| Mark | Area | Distance (m) | Conditions | Instantaneous Probability Pi (%) | |
|---|---|---|---|---|---|
| ① | a | 0~50 | having area even if only slightly | 100 | HIGH |
| ② | b | 0~60 | center exists in area | 80 | |
| ③ | c | 61~100 | center exists in area | 60 | PRIORITY |
| ④ | d | 0~140 | center exists in area | 40 | |
| ⑤ | e | 0~100 | center exists in area | 10 | |
| ⑥ | | | not satisfying all conditions 1 to 5 | 0 | LOW |

FIG. 26

| Distance (m) | Wave (Load Average Value) |
|---|---|
| 100 or more | 0.96 |
| 20 to less than 40 | 0.87 |
| 10 to less than 20 | 0.85 |
| less than 10 | 0.75 |
| others | $0.87 + (0.96 - 0.87) \times (Z - 40) / (100 - 40)$ |

OBJECT RECOGNITION APPARATUS FOR VEHICLE, AND INTER-VEHICLE DISTANCE CONTROL UNIT

BACKGROUND OF THE INVENTION

1) Field of the Invention

The present invention relates to a vehicle object recognition apparatus which is designed to emit or radiate transmission waves throughout a predetermined angular range in each of vertical (vehicle-height) and horizontal (vehicle-width, lateral) directions from one vehicle to recognize an object in front of the vehicle on the basis of reflected waves thereof, and further to an inter-vehicle control unit.

2) Description of the Related Art

So far, for example, as disclosed in Japanese Patent Laid-Open No. 2002-40139, there has been proposed an object recognition apparatus designed to emit an optical wave or millimetric wave to detect a reflected wave thereof for recognizing an object existing in a forward direction. For example, such an apparatus is applicable to an apparatus made to detect a vehicle in a forward direction and issue an alarm, an apparatus made to control a vehicle speed for keeping a predetermined distance (inter-vehicle distance) between oneself (this vehicle) and the vehicle ahead, or the like. That is, it has been incorporated into applications involving the recognition of a vehicle existing in a forward direction.

The aforesaid object recognition apparatus is designed to emit a plurality of transmission waves forwardly throughout a predetermined angular range in each of vertical and horizontal directions from one vehicle for recognizing a preceding vehicle three-dimensionally on the basis of the reflected waves thereof. At this time, in a case in which a reflecting object (reflection-causing object) lies at a height or in a range where a vehicle does not exist normally, for a non-vehicle (an object other than vehicles) recognition, different transmission wave output levels are set according to transmission wave outputting regions or zones to make it harder for the non-vehicle to be identified as a preceding vehicle or a non-vehicle discrimination is made through the use of a non-vehicle decision map for distinguishing a non-vehicle from a vehicle. In this case, the non-vehicle decision map signifies a three-dimensional map in which a reflected wave reception intensity range for distinguishing between a non-vehicle and a vehicle is set in a state associated with an existing region of a reflecting object in a case in which a vehicle width, a vehicle height and a vehicle forwarding direction are taken as X, y and Z axes, respectively.

However, as mentioned above, for the transmission wave output level to be changed according to a transmission wave outputting region or for a non-vehicle to be discriminated through the use of the non-vehicle decision map, there is a need to mount a radar unit, which detects the reflected waves, on a vehicle with an extremely high accuracy. In other words, if a transmission wave output axis is shifted depending on the mounted state of the radar unit, difficulty is encountered in making the discrimination between a non-vehicle and a vehicle, for that a region in which a reflecting object exists cannot be discriminated with accuracy.

For this reason, in a conventional technique, when a radar unit is mounted on a vehicle, an operator adjusts the mounting angle thereof and others through the use of an adjusting bolt or the like. However, the adjustment operation becomes more difficult as the tolerance (tolerable range) of the mounting angle of the radar unit is made smaller (narrower), and it takes time, which leads to an increase in manufacturing cost.

Furthermore, so far, there has been known an inter-vehicle distance control unit made to measure a distance from a preceding vehicle and a relative speed thereto for keeping an inter-vehicle distance constant, wherein the probability that a preceding vehicle and oneself (this vehicle) exists on the same lane is calculated to select a preceding vehicle as an object (counterpart) of inter-vehicle distance control on the basis of the calculated probability, as exemplified in Japanese Paten Laid-Open No. HEI 8-279099. In more detail, in the inter-vehicle distance control unit disclosed in this document, for example, when a plurality of objects (bodies) are detected, the position of each of the objects is put on a one's-lane probability map set in advance through actual measurements to obtain the probability that each of the objects exists on the same lane as that of this vehicle (in other words, the priority rate in handling as an object of inter-vehicle distance control) for selecting the object having the highest probability as a preceding vehicle which is a counterpart for the inter-vehicle distance control. The inter-vehicle distance control is implemented to maintain the distance with respect to the selected preceding vehicle.

The aforesaid one's-lane probability map to be used for the conventional inter-vehicle distance control unit is composed of a plurality of areas and a probability of a preceding vehicle existing on the same lane of that of oneself being allocated or given to each area. However, if this one's-lane probability map is applied to both a stopping (stationary) object and a moving object recognized through a forward obstacle recognition processing, the following problems arise.

For example, in a case in which an obstacle recognized through the forward obstacle recognition processing is a stopping object, since the stopping object is recognized as a stationary thing, if it exists outside its own lane, the probability of the existence on the same lane can be set at a low value without depending on the distance up to the obstacle. However, in a case in which an obstacle recognized through the forward obstacle recognition processing is a moving object, even if it exists outside its own lane, there is a possibility that the moving object cuts into the lane immediately before oneself. For this reason, in particular, when the distance to the obstacle is short, there is a need to set the probability of the existence on the one's lane as that of this vehicle to a high value in some degree.

Thus, since the conventional one's-lane probability map is used for both the stopping object and moving object recognized through the forward obstacle recognition processing, the probability is not set in conjunction with a state of the object, which makes it difficult to precisely select an object for the inter-vehicle distance control.

SUMMARY OF THE INVENTION

The present invention has been developed with a view to eliminating the above-mentioned problems, and it is therefore an object of the present invention to provide a vehicle object recognition apparatus capable of outputting transmission waves throughout an appropriate angular range while allowing for a sufficient tolerance when a radar unit is mounted on a vehicle, and further to provide an inter-vehicle distance control unit capable of accurately selecting an object for the inter-vehicle distance control.

For this purpose, a vehicle object recognition apparatus according to an aspect of the present invention comprises setting means for, on the basis of a result of transmission/ reception relative to a predetermined target acquired by a radar unit, setting an angular range of emission (radiation) of a transmission wave in at least one of vertical and horizontal directions of a vehicle to an angular range smaller than a predetermined emission angular range establishable by the radar unit, and for recognition of a reflecting object, the radar unit emits the transmission wave in the smaller angular range set by the setting means.

That is, an angular range (smaller angular range) in which a vehicle or the like existing in a forward direction is detected as a reflecting object is set on the basis of a transmission/reception result relative to a predetermined target acquired by the radar unit. Therefore, even in a case in which the radar unit has a sufficient tolerance of a mounting angle, the setting of an appropriate transmission-wave emission range becomes feasible. This can simplify the adjustment operation on the mounting angle of the radar, which contributes to the reduction of the manufacturing cost.

In this case, preferably, the predetermined target is a fixed object located at a predetermined distance and at a predetermined height with respect to the vehicle on which the radar unit is mounted.

Thus, when a fixed object is used as the target, the transmission-wave emission angular range for the recognition of an object can accurately be set to a desired range on the basis of a reflected wave from the fixed object.

In addition, in this configuration, preferably, the radar unit is made to emit a plurality of transmission waves in vertical and horizontal directions of the vehicle, and the setting means sets the smaller angular range so that the transmission wave having an angle at which the reflected wave from the predetermined target shows a maximum reception level is centered in the smaller angular range. That is, the predetermined target is placed at the central position of the transmission-wave emission range, and the smaller angular range in which the transmission waves are emitted is set so that a transmission wave directed to this target is positioned at its center. Thus, the setting of the smaller angular range is facilitated and the angle is adjustable to the center of the output axis of the transmission wave.

Still additionally, preferably, the transmission-wave emission angle is set so that the transmission waves adjacent to each other in a vertical direction overlap partially in their boundary region. For example, when the transmission wave is an optical wave, in principle, its resolution depends upon the diameter of the optical beam. However, as mentioned above, in a manner such that an overlapping portion is provided at the boundary region between the adjacent transmission waves in a vertical direction, a discrimination can be made between a case in which a reflected wave occurs in connection with each transmission wave itself and a case in which a reflected wave occurs in connection with both the adjacent transmission waves. This improves the resolution in the vertical direction.

Yet additionally, when the setting means sets the smaller angular range, the radar unit emits a transmission wave at the target within an angular error margin (angular tolerance) of the mounting of the radar unit on the vehicle. In a case in which the target is set at the central position in the transmission-wave emission range, if a transmission wave is emitted within the mounting angular error margin, the reflected wave from the target is always receivable.

Moreover, preferably, the vehicle object recognition apparatus further comprises calculation means for calculating a central output axis angle of the radar unit on the basis of reception levels of transmission waves emitted from upper and lower sides with respect to a transmission wave having an angle which provides a maximum reception level. When the target is in opposed relation to one transmission wave, the reception level of the reflected wave from the target becomes at a maximum. However, even the transmission waves emitted from both the upper and lower sides of that transmission wave produce the reflected waves from the target to be received, although low in reception level. At this time, for example, if the target is closer to the lower-side transmission-wave emission region than the upper-side transmission-wave emission region, the reception level of the reflected wave of (due to) the lower-side transmission wave (transmitted wave) becomes higher than the reception level of the reflected wave of the upper-side transmission wave. Therefore, the output axis angle in the angular range of the transmission wave to be emitted at a central position can be calculated in detail on the basis of the ratio or difference between the reception levels of the reflected waves of the both the upper- and lower-side transmission waves, or the like. This enables the output axis angle of the radar unit to be detectable with high accuracy.

Still moreover, preferably, the vehicle object recognition apparatus further comprises decision means for making a decision as to whether the output axis of the radar unit takes an upturn or a downturn when the central output axis angle is out of a reference angular range, and in accordance with a downturn or upturn decision in the decision means, recognition means lowers the probability of a reflecting object being recognized as a vehicle, on the basis of the reflected wave of a transmission wave emitted from an angle on the lower or upper side with respect to the central position of the smaller angular range. That is, in a case in which the central output axis angle is out of a predetermined reference angular range, a decision can be made as to whether the radar unit is mounted to take an downturn or upturn. For example, in a case in which the radar unit is mounted to take a downturn, there is a high possibility that a transmission wave emitted from an angle on the lower side with respect to the central position of the smaller angular range is reflected by a reflecting object, such as delineator (cat's-eye), installed on a road. Thus, after the downturn decision or the upturn decision, when the probability of the reflecting object being recognized as a vehicle is lowered on the basis of the reflected wave of a transmission wave emitted from an angle on the lower or upper side with respect to the central position of the smaller angular range, it is possible to reduce the possibility that a non-vehicle is recognized as a vehicle in error.

Yet moreover, if the central output axis angle calculated is a downturn angle with respect to a reference angle, in a case in which detected is only the reflected wave of a transmission wave emitted from a lower side with respect to a transmission wave having an angle which provides a maximum reception level, the recognition means can recognize that the reflecting object is a non-vehicle. That is, in a case in which the radar unit is mounted to turn upward, if the reflected wave occurs due to only a transmission wave emitted from a lower side with respect to a transmission wave having an angle which provides the highest reception level, since the vertical position of that reflecting object is very low, a decision can be made that the reflection is not from a vehicle. Thus, by precisely acquiring the angle of the output axis of the radar unit through the use of the calculation means mentioned above, the discrimination between a vehicle and a non-vehicle is achievable with higher accuracy.

Furthermore, preferably, the vehicle object recognition apparatus further comprises estimation means for estimating a central output axis angle of a transmission wave in a vertical direction of the radar unit on the basis of a reflected wave stemming from a reflector of a preceding vehicle satisfying a predetermined condition, and correction means for correcting the calculated central output axis angle when the central output axis angle estimated by the estimation means is shifted from the central output axis angle calculated by the calculation means.

Even if the transmission-wave emission range is set to a desired range through the use of a predetermined target, the emission range varies with the loading state of the vehicle, the number of passengers, and the like. Moreover, the mounted state of the radar unit can vary due to vibrations or the like when the vehicle runs repeatedly. Therefore, a decision is made as to whether the central output axis angle calculated through the use of a predetermined target is shifted or not, and the correction is made if it is shifted.

Accordingly, this vehicle object recognition apparatus detects the shifting of the central output axis angle of the radar unit through the use of a reflector always mounted on a vehicle. Concretely, in the case of a passenger car, the reflector is mounted at a position remote by an approximately 75 cm above the ground and the difference in mounting height among motor vehicles is small. This enables the central output axis angle of a transmission wave in the vertical direction of the radar unit to be estimated on the basis of a reflected wave from a reflector of a preceding vehicle satisfying a predetermined condition signifying a passenger car. If the central output axis angle estimated differs from the calculated central output axis angle, the correction is made with respect to the calculated central output axis angle.

In this configuration, preferably, when a preceding vehicle exists in a distance range prescribed by predetermined upper and lower limits, the estimation means estimates the central output axis angle. That is, when the distance from the preceding vehicle is shorter than the lower limit distance, the reception level of the reflected wave from the vehicle body becomes high, which makes it difficult to distinguish the reflected wave stemming from the reflector. On the other hand, if the distance from the preceding vehicle exceeds the upper limit distance, the reception state of the reflected wave becomes easily unstable.

Moreover, preferably, when the lateral width of a preceding vehicle falls within a predetermined range, the estimation means estimates the central output axis angle. This enables correcting the central output axis angle with respect to passenger cars having reflectors located at approximately same height positions above the ground.

In addition, an inter-vehicle distance control unit according to a further aspect of the present invention comprises measurement (ranging) means for emitting (radiating) a transmission wave around one's (own) vehicle to detect a distance up to a reflecting object and an emission angle of the transmission wave on the basis of a result of detection of a reflected wave of the transmission wave, calculation means for calculating a relative position and a relative speed of the reflecting object with respect to the one's vehicle on the basis of the distance and the emission angle detected by the measurement means, object state decision means for, on the basis of the relative speed calculated by the calculation means, making a decision as to whether the reflecting object is in a moving state or in a stopping state, one's-lane probability calculating means for changing a probability of the existence of the reflecting object on the same lane as that of the one's vehicle, to be allocated to the reflecting object, on the basis of the relative position calculated by the calculation means in accordance with the moving/stopping state of the reflecting object determined by the decision means, and inter-vehicle distance control means for selecting a preceding vehicle for inter-vehicle distance control on the basis of the probability allocated by the one's-lane probability calculating means to control an inter-vehicle distance relative to the selected preceding vehicle.

Thus, the inter-vehicle distance control unit according to the present invention obtains the probability of the existence of the reflecting object on the same lane as that of one's vehicle according to a state of the reflecting object and selects the reflecting object, i.e., a preceding vehicle, for the inter-vehicle distance control. Accordingly, for example, in consideration of the moving state or stopping state of the preceding vehicle, the probability of the existence on the same lane as that of one's vehicle becomes obtainable. As a result, the accurate selection of the preceding vehicle which is an object of inter-vehicle distance control can be made on the basis of a state of the preceding vehicle.

In addition, in this configuration, the one's-lane probability calculating means includes a stopping object probability map indicative of a distribution of probability of the existence on the same lane as that (one's lane) of the one's vehicle, associated with a relative position of the reflecting object which takes a stopping state as a decision result in the object state decision means, a moving object probability map indicative of a distribution of probability of the existence on the same lane as that of the one's vehicle, associated with a relative position of the reflecting object which takes a moving state as a decision result in the object state decision means, and probability detecting means for obtaining a probability of the existence of the reflecting object on the same lane as that of the one's vehicle by applying the relative position, calculated by the calculation means, to the probability map for the state of the reflecting object to which the object state decision means makes a decision.

Thus, a probability map on the existence on the same lane as that of one's vehicle is prepared for each state of a reflecting object, thereby allocating an appropriate probability to each of a moving object and a stopping object.

Still additionally, in this inter-vehicle distance control unit, the stopping object probability map and the moving object probability map prescribes the relative position of the reflecting object on the basis of a distance in a lateral direction of the one's vehicle and a distance in a forward direction of the one's vehicle, and a probability allocation range of the stopping object probability map, in which the probability of the existence on the same lane is allocated, is set to be smaller than a probability allocation range of the moving object probability map in which the probability of the existence on the same lane is allocated.

For example, even in a case in which the present relative position of a moving object is not on the same lane as that of one's vehicle, since there is a possibility that the moving object exists on the same lane afterward, there is a need to set a wide probability allocation range. On the other hand, in a case in which the present relative position of a stopping object does not exist on the same lane as that of one's vehicle, since the possibility that it exists on the same lane afterward is considered to be considerably low, the probability allocation range can be set to be smaller than the probability allocation range in the case of the moving object.

Thus, when a decision is made between a stopping reflecting object to use a moving reflecting object and probability maps different in probability allocation area and prepared according to object state, the appropriate probability allocation according to an object state becomes feasible.

Yet additionally, in this inter-vehicle distance control unit, the stopping object probability map has a distribution of probability on a length in a lateral or horizontal direction corresponding to a width of a lane on which the one's vehicle travels, and the probability distribution is made laterally narrower toward a center in the lateral direction as a distance from the one's vehicle in its forward direction becomes longer after exceeding a predetermined distance, and shows a lower probability as the distance in the forward direction of the one's vehicle becomes longer and a distance from the center of the one's vehicle in the lateral directions becomes longer.

Thus, when the stopping object probability map for obtaining a probability of the existence of a stopping reflecting object on the same lane as that of the one's vehicle is set so that the probability becomes lower as the stopping object becomes more remote from the one's vehicle in the forward and lateral directions. This enable the probability of the existence on the same lane as that of the one's vehicle to be set at a high value with respect to only a reflecting object existing in the vicinity of a position immediately before the one's vehicle. Moreover, since it can be considered that, basically, the stopping reflecting object does not move, the probability distribution can be made in a range of a length corresponding to the width of the lane on which the one's vehicle travels, thereby avoiding the after acquisition of the probability for a reflecting object which does not exist on the same lane as that of the one's vehicle.

Moreover, in this inter-vehicle distance control unit, the moving object probability map is set so that a probability distribution is made in a range of a length obtained by adding a lateral length corresponding to the widths of right- and left-side lanes relative to the one's vehicle to a lateral length corresponding to a width of a lane on which the one's vehicle travels, and the probability distribution spreads laterally from a center in the lateral direction as a distance from the one's vehicle in its forward direction becomes longer, and the probability becomes lower with the spreading from the center of the one's vehicle in the lateral direction.

Thus, the moving object probability map for obtaining a probability of the existence of a moving reflecting object on the same lane as that of the one's vehicle is set so that the distribution spreads from the lateral center of the one's vehicle as the distance from the one's vehicle in the forward direction becomes longer and the probability is set to become lower with the spreading from the center of the one's vehicle in the lateral direction. This enables the probability for a preceding vehicle, which can cut into the lane of the one's vehicle from a right- or left-side lane with respect to the one's lane and from a remote position, to be set to become higher in a stepwise fashion with the passage of time. In addition, since the probability distribution is made in a range of a distance obtained by adding a length corresponding to the widths of the right- and left-side lanes to the width of the lane on which the one's vehicle travels, it is possible to obtain the probability for a reflecting object which exists on right- or left-side lane but which has a chance of existing on the same lane as that of the one's vehicle afterward.

Still moreover, in this inter-vehicle distance control unit, the one's-lane probability calculating means includes probability calculating means for calculating a new probability through averaging processing on the basis of the probability calculated the last time and the probability obtained by the probability detecting means. Thus, the probability of the existence on the same lane as that of the one's vehicle is calculated to be at a higher value with respect to a reflecting object continuously detected by the measurement means.

Furthermore, in this inter-vehicle distance control unit, in the time-averaging processing, the probability calculation means changes the weighting of the probability calculated the last time and the probability obtained by the probability detecting means in accordance with the distance to the reflecting object detected by the measurement means.

For example, when the weighting of the probability obtained by the probability detecting means is made larger as the distance becomes longer, the probability of the existence of a reflecting object, approaching the one's vehicle, on the same lane as that of the one's vehicle can be set at a high value.

Still furthermore, in this inter-vehicle distance control unit, in selecting a preceding vehicle for the inter-vehicle distance control, the inter-vehicle distance control means selects a reflecting object having the highest probability, obtained by the one's-lane probability calculating means, as the preceding vehicle for the inter-vehicle distance control. This enables preferentially controlling the inter-vehicle distance with respect to a preceding vehicle which requires a preferential treatment.

BRIEF DESCRIPTION OF THE DRAWINGS

Other objects and features of the present invention will become more readily apparent from the following detailed description of the preferred embodiments taken in conjunction with the accompanying drawings in which:

FIG. 25 is an illustration of conditions to be taken in obtaining an instantaneous one's-lane probability from the one's-lane probability map for a stopping object according to the second embodiment;

FIG. 26 is an illustration of the extraction of a load average value associated with a distance from one's vehicle according to the second embodiment.

DESCRIPTION OF THE PREFERRED EMBODIMENTS

Figure 1:
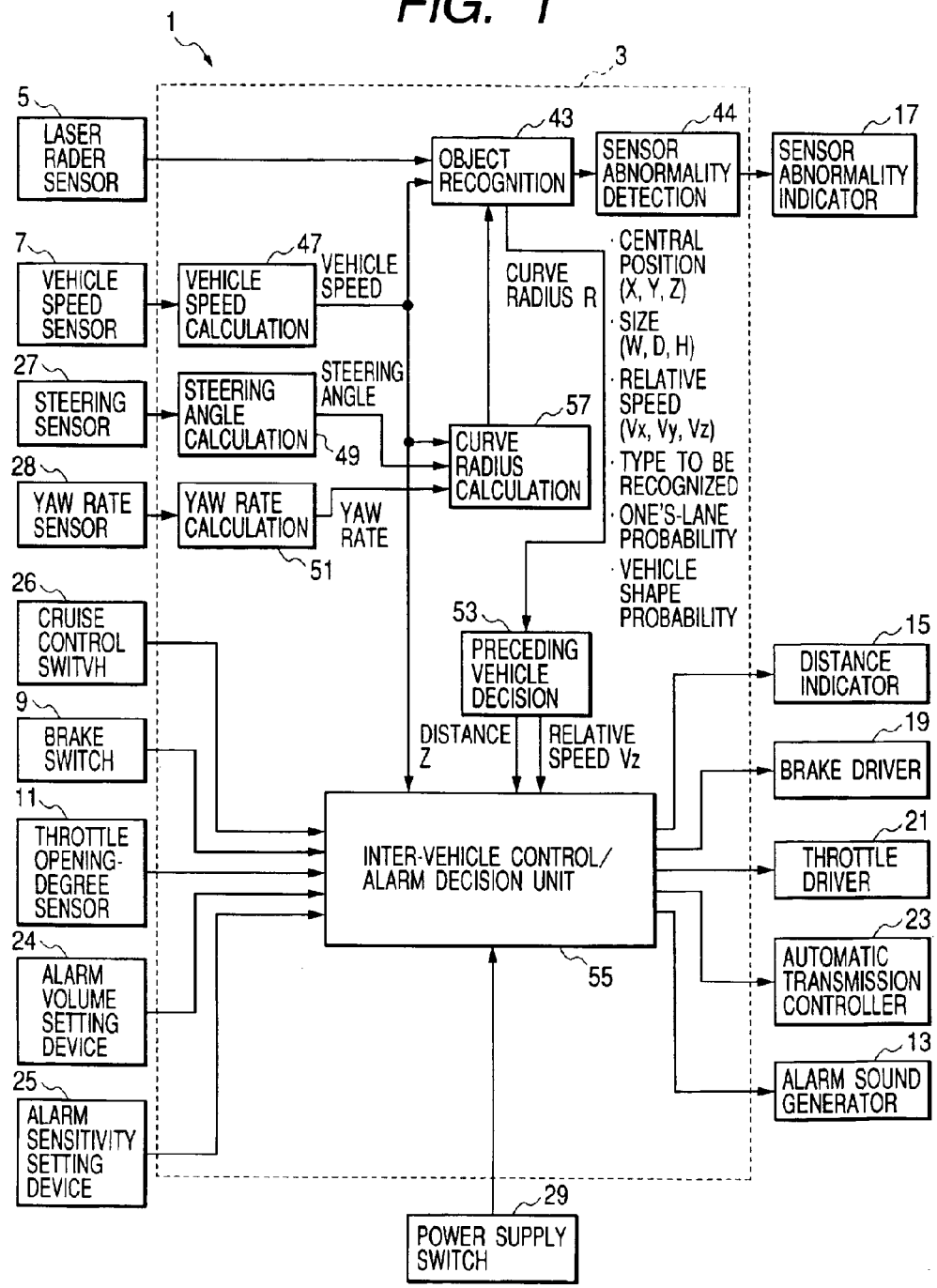
FIG. 1 is a block diagram showing a configuration of a vehicle control apparatus based on a vehicle object recognition apparatus according to a first embodiment of the present invention.

Embodiments of the present invention will be described hereinbelow with reference to the drawings.

(First Embodiment)

First of all, referring to the drawings, a description will be given hereinbelow of a vehicle control apparatus using an object recognition apparatus according to the present invention. This vehicle control apparatus is mounted in a vehicle and is designed to output an alarm when an obstacle exists in an alarming region or to control the vehicle speed according to a vehicle existing in a forward direction (preceding vehicle).

FIG. 1 is a flow diagram showing a system configuration of the vehicle control apparatus generally designated at reference numeral 1. The vehicle control apparatus 1 is constructed using a recognition/inter-vehicle control ECU 3 serving as a principal unit. The recognition/inter-vehicle control ECU 3 is basically composed of a microcomputer, and is equipped with input/output interfaces (I/O) and various types of drive circuits and various types of detection circuits. This hardware configuration is of a general type, and the description thereof will be omitted for brevity.

The recognition/inter-vehicle control ECU 3 receives various detection signals from a laser radar sensor 5, a vehicle speed sensor 7, a brake switch 9 and a throttle opening-degree sensor 11, while outputting drive signals to an alarm sound generator 13, a distance indicator 15, a sensor abnormality indicator 17, a brake driver 19, a throttle driver 21 and an automatic transmission controller 23. Moreover, to the recognition/inter-vehicle control ECU 3, there are connected an alarm sound volume setting device 24 for setting an alarm sound volume, an alarm sensitivity setting device 25 for setting the sensitivity in alarm decision processing, a cruise control switch 26, a steering sensor 27 for detecting an operating degree of a steering wheel (not shown), and a yaw rate sensor 28 for detecting a yaw rate occurring in the vehicle. Still moreover, the recognition/inter-vehicle control ECU 3 is equipped with a power supply switch 29 and starts predetermined processing in response to the turning-on of the power supply switch 29.

Figure 2A:
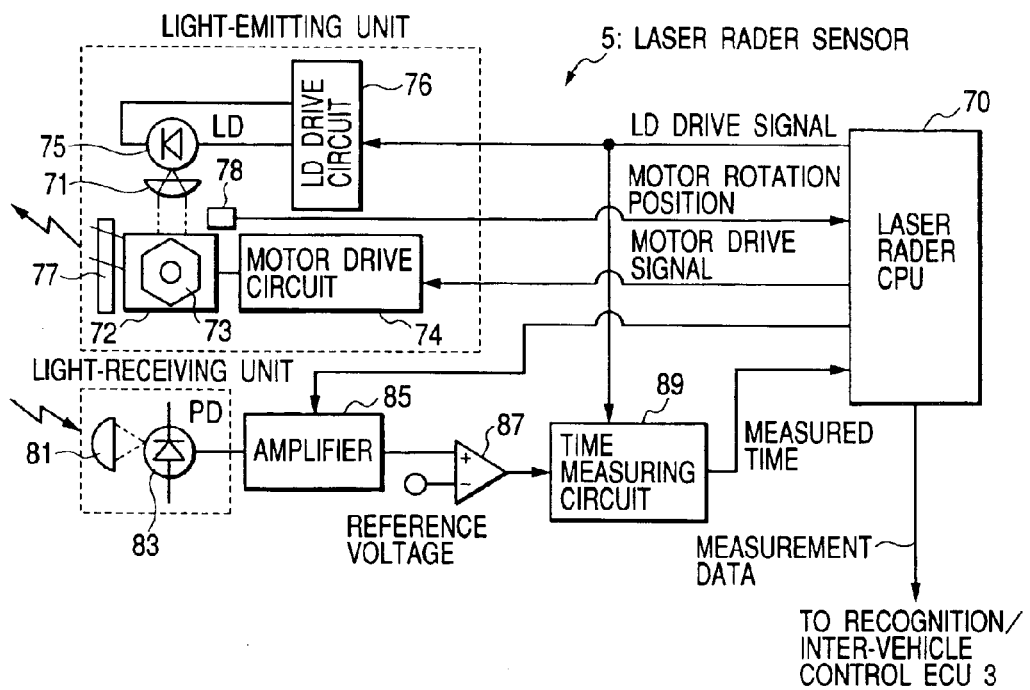
FIG. 2A is an illustration of a configuration of a laser radar sensor according to the first embodiment.

As FIG. 2A shows, the laser radar sensor 5 includes, as principal components, a light-emitting unit, a light-receiving unit, a laser radar CPU 70, and other components. That is, the laser radar sensor 5 is equipped with, in addition to the light-emitting unit and the light-receiving unit acting as a radar unit, the laser radar CPU 70 made to calculate a distance to a reflecting object and positions in vertical and horizontal (lateral) directions of a vehicle on the basis of a detection result in the light-emitting/light-receiving section.

The light-emitting unit includes a semiconductor laser diode (which will hereinafter be referred to simply as a "laser diode") 75 for emitting a pulse-like laser beam (laser light) through a light-emitting lens 71, a scanner 72 and a glass plate 77. The laser diode 75 is connected through a laser diode drive circuit 76 to the laser radar CPU 70 to emit a laser beam (light generation) in accordance with a drive signal from the laser radar CPU 70. Moreover, in the scanner 72, a polygon mirror 73 serving as a reflector is provided to be rotatable, and when a drive signal from the laser radar CPU 70 is inputted thereto through a motor drive unit 74, the polygon mirror 73 is rotated by a driving force from a motor (not shown). The rotational position of this motor is detected by a motor rotational position sensor 78 and is outputted to the laser radar CPU 70.

The polygon mirror 73 has six mirrors (reflecting surfaces) different in surface inclination angle from each other, thereby incontinuously outputting laser beams in a scanning fashion within a predetermined angular range in each of the vertical and horizontal directions of the vehicle.

The light-receiving unit of the laser radar sensor 5 includes a light-receiving element (photodiode) 83 which receives, through a light-receiving lens 81, a laser beam reflected on an object (not shown) to output a voltage corresponding to the intensity of the received light. The output voltage from the light-receiving element 83 is amplified in an amplifier 85 and then supplied to a comparator 87. The comparator 87 compares an output voltage from the amplifier 85 with a reference voltage and outputs a light-reception signal to a time measuring circuit 89 when the output voltage>the reference voltage.

Figure 2B:
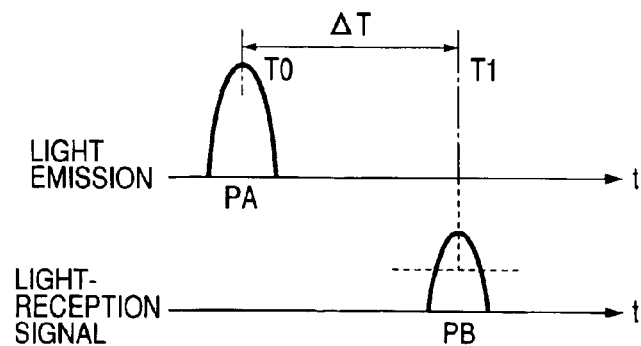
FIG. 2B is an illustration for explaining a distance detecting method using the laser radar sensor according to the first embodiment.

To the time measuring circuit 89, there is also inputted a drive signal outputted from the laser radar CPU 70 to the laser diode drive circuit 76. Moreover, as FIG. 2B shows, the aforesaid drive signal is taken as a start pulse PA and the aforesaid light-reception signal is taken as a stop pulse PB, and the phase difference between the two pulses PA and PB (that is, the difference $\Delta T$ between the time T0 at which a laser beam is emitted and the time T1 at which the reflected light is received) is encoded into a binary digital signal. Still moreover, the pulse width of the stop pulse PB is measured in the form of time. After encoded into binary digital signals, these values are outputted to the laser radar CPU 70.

Figure 3:
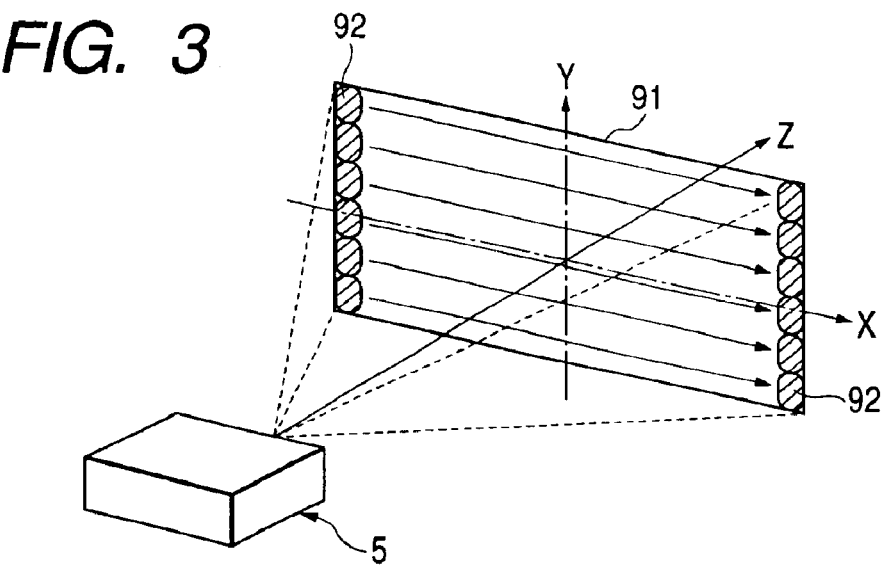
FIG. 3 is a perspective view showing an emission-possible region of the laser radar sensor according to the first embodiment.

Referring to FIGS. 3 to 9, a description will be given hereinbelow of a laser beam emission-possible area and a recognition area to be used in actually recognizing an object such as a preceding vehicle. FIG. 3 shows laser beam patterns 92 made when a laser beam is emitted to only right and left end portions of an emission-possible area 91, and the laser beam patterns at intermediate positions are omitted from the illustration. Moreover, although in FIG. 3 the laser beam patterns 92 have an elliptical configuration, the present invention is not limited to this configuration but, for example, a rectangular configuration or the like is also acceptable. Still moreover, instead of the laser beam (light), an electric wave such as a millimetric wave, an ultrasonic wave, or the like are also acceptable. Yet moreover, the present invention is not limited to the scanning, but a method capable of measuring bearings in X and Y directions, other than distances, is also acceptable.

As FIG. 3 shows, when the Z axis is taken as a laser beam emitting direction, the laser radar sensor 5 can sequentially scan the emission-possible area 91 in a X-Y plane perpendicular to the Z axis.

Figure 4:
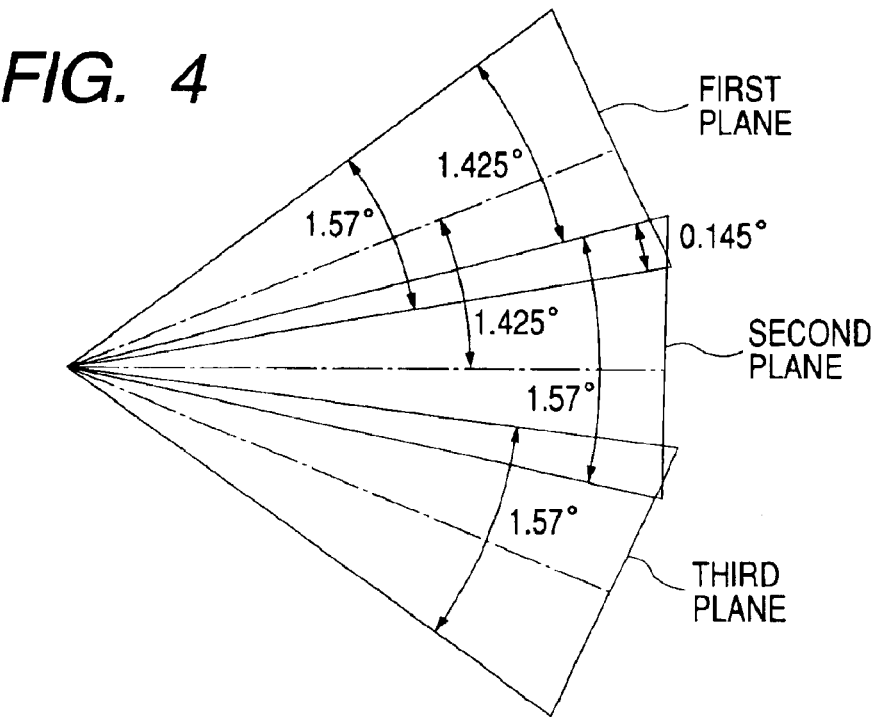
FIG. 4 is an illustration for explaining divergence angles of a laser beam, emitted from the laser radar sensor, in a Y-axis direction and overlapping ranges according to the first embodiment.

In this embodiment, as FIG. 4 shows, the laser beam emission angle is set so that the laser beams adjacent to each other in a vertical direction of the vehicle (Y-axis direction) overlap partially at their boundary region. That is, In the Y-axis direction, each of the laser beams has a divergence angle of 1.57 degree. The angular range in which the laser beams overlap is 0.145 degree. Therefore, the angle between the central axes of the laser beams becomes 1.425 degree. In FIG. 4, only three laser beams are shown for convenience only.

In this way, when the emission angle is set so that the laser beams adjacent to each other in the Y-axis direction overlap partially, the resolution in the Y-axis direction is improvable. That is, in FIG. 4, when the laser beams are defined as the first, second and third planes, respectively, from top down, the discrimination can be made among five patterns: the reflection of only the first-plane laser beam, the reflection of the first- and second-plane laser beams, the reflection of only the second-plane laser beam, the reflection of the second- and third-plane laser beams, and the reflection of only the third-plane laser beam. In particular, in the case of the second plane, since the laser-beam overlapping regions exist at both side portions, the degree of improvement of the resolution in the vicinity of the laser light in the second plane is increasable.

In this embodiment, the Y axis forming the vertical (height) direction is taken as a reference direction and the X axis forming the horizontal (lateral) direction is taken as a scanning direction, and the emission-possible area 91 is such that 0.08 degree×501 points=±20 degree in the X-axis direction and 1.57 degree×6 lines−0.145 degree×5 (overlapping regions)=8.695 degree in the Y-axis direction. Moreover, the scanning direction is from the left side to the right side in FIG. 3 in the case of the X-axis direction and is from the upper side to the lower side in FIG. 3 in the case of the Y-axis direction.

Secondly, referring to FIGS. 5 to 9, a description will be given hereinbelow of a recognition area 93.

The laser radar sensor 5 is mounted on a front surface of a vehicle. For example, it is mounted on a lower portion of a bumper of the vehicle. It is required that a laser beam emitted from this laser radar sensor 5 be precisely directed at an object or body existing in front of this vehicle (one's vehicle), i.e., a delineator (cat's-eye), a guard rail or the like which is for making a judgment about a preceding vehicle or cruising lane. Therefore, there is a need to mount the laser radar sensor 5 on the vehicle while adjusting the mounting angle of the laser radar sensor 5 to a mounting reference angle for preventing the laser beam emission area from shifting up and down, from side to side.

However, the operator's operation for the adjustment of the mounting angle of the laser radar sensor 5 through the use of a mechanical means such as an adjustment bolt becomes more difficult as the tolerance of the mounting angle of the laser radar 5 relative to the mounting reference angle decreases, and the operation takes a long time.

For this reason, in this embodiment, instead of the adjustment by such a mechanical means, the angular range of a laser beam emitted from the laser radar sensor 5 is adjusted to a desired reference angular range through the use of software processing in the laser radar sensor 5.

Figure 6:
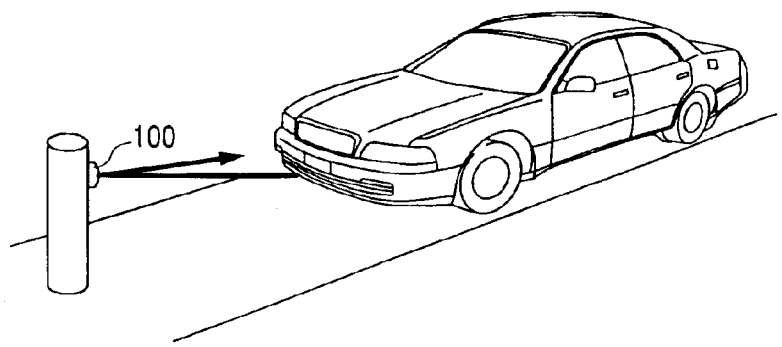
FIG. 6 is a perspective view showing a positional relationship between a vehicle and a target according to the first embodiment.

Accordingly, as FIG. 6 shows, a vehicle carrying the laser radar sensor 5 is moved to a position separated by a predetermined distance with respect to a target 100 with a high laser beam reflectance, installed at a predetermined height.

Figure 5:
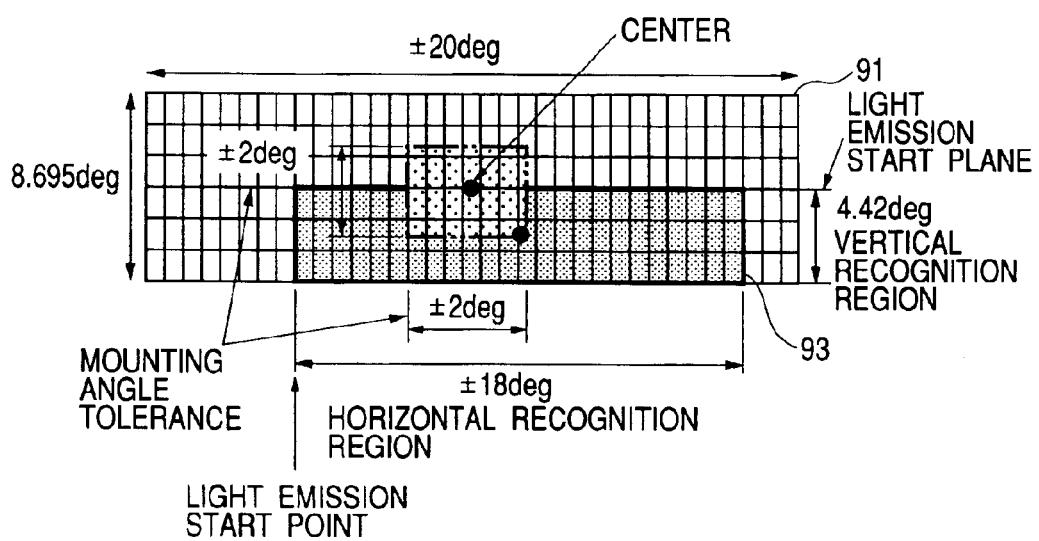
FIG. 5 is an illustration for explaining a recognition area setting method in the laser radar sensor according to the first embodiment.
Figure 7:
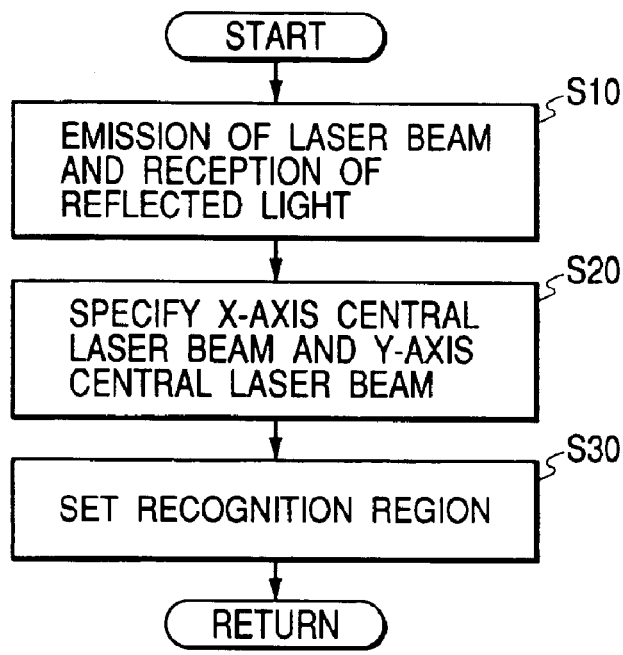
FIG. 7 is a flow chart showing the processing for setting a recognition area according to the first embodiment.

In this state, the processing shown in the flow chart of FIG. 7 is carried out to set the recognition region (region to be used for the recognition) 93. That is, in FIG. 7, in a step S10, a laser beam is emitted at the target 100 to receive the reflected light therefrom. At this time, the emission angular range of the laser beam emitted corresponds to the tolerance of the mounting angle of the laser radar sensor 5 as shown in FIG. 5. In the example shown in FIG. 5, the tolerance is ±2 degree in each of the vertical and horizontal directions of the vehicle, and is considerably lightened, as compared with a conventional one.

In this case, when the mounting angle of the laser radar sensor 5 agrees with the mounting reference angle, the target 100 is located to be positioned at the center of the laser beam emission angular range. Therefore, when the laser beam is emitted within the emission angular range corresponding to the tolerance of the mounting angle of the laser radar sensor 5, the laser radar sensor 5 can always receive the reflected light from the target 100.

Following this, in a step S20, with respect to the X-axis and Y-axis directions, a laser beam corresponding to a reflected wave with a highest light-reception intensity, of the received reflected waves, is specified as a central laser beam.

Figure 8:
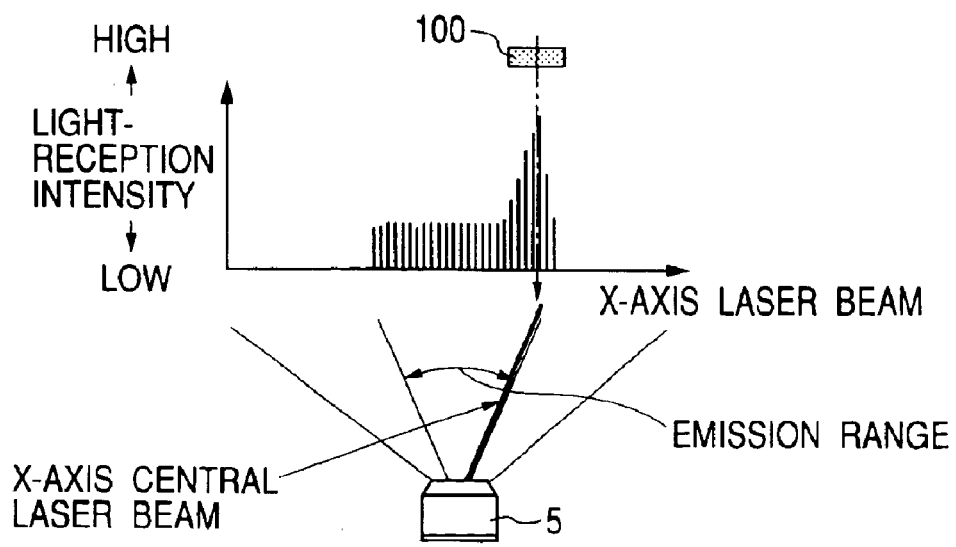
FIG. 8 is a graphic illustration of light-reception intensities of reflected light of laser beams from a target when the scanning is made with the laser beams in an X-axis direction within a laser beam emission angular range corresponding to a tolerance of the mounting angle of the laser radar sensor.
Figure 9:
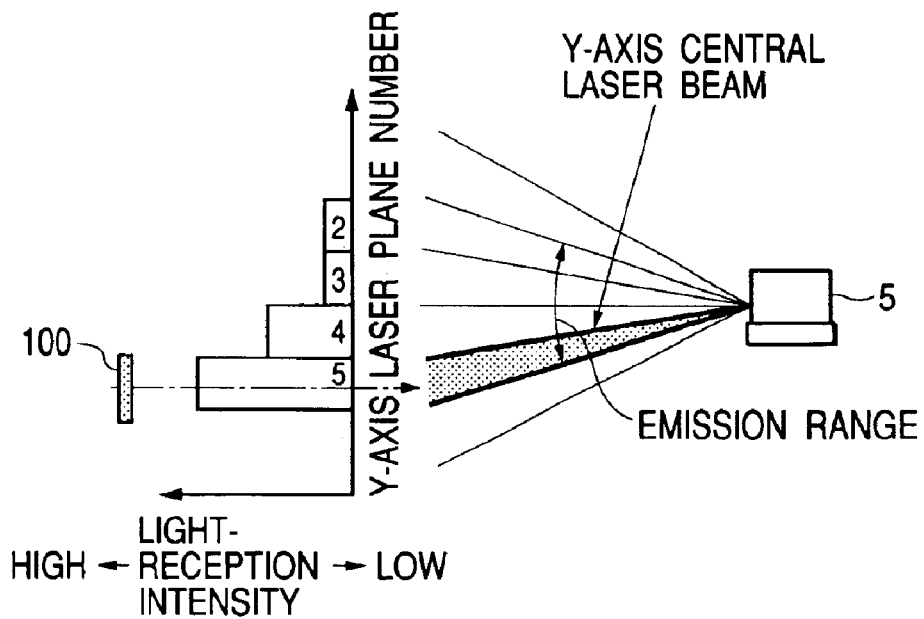
FIG. 9 is a graphic illustration of light-reception intensities of reflected light of laser beams from a target when the scanning is made with the laser beams in an Y-axis direction in a laser beam emission angular range corresponding to a tolerance of the mounting angle of the laser radar sensor.

Referring to FIGS. 8 and 9, a description will be given hereinbelow of this specification of the central laser beam. FIG. 8 is an illustration of light-reception intensities of reflected light of laser beams from the target 100 when the scanning is made with the laser beams in the X-direction in the aforesaid laser beam emission angular range, and FIG. 9 is an illustration of light-reception intensities of reflection light of laser beams from the target 100 when the scanning is made with the laser beams in the Y-axis direction. As obvious from FIGS. 8 and 9, the laser beams corresponding to the reflected lights with the highest light-reception intensity are taken as an X-axis central laser beam and a Y-axis central laser beam, respectively.

The examples of FIGS. 8 and 9 show a case that the position of the target 100 is most shifted from the center in the tolerance zone of the mounting angle of the laser radar 5 (+2 degree in each of X- and Y-axis directions) as shown in FIG. 5. Therefore, in this case, the laser beams emitted at the end portions of the laser beam emission angular range becomes the X-axis central laser beam and the Y-axis central laser beam, respectively.

In a step S30, the recognition region 93 is set on the basis of the X-axis and Y-axis central laser beams that is, as shown in FIG. 5, a vertical area having a range of ±18 degree (corresponding to 451 laser beams) in the X-axis direction and a horizontal area having a range of 4.42 degree (corresponding to 3 laser beams) are determined with respect to the X-axis and Y-axis central laser beams and used as the recognition region 93.

When the recognition region 93 is set using the target 100 in this way, the adjustment to the reference angle for the central laser beam positioned at the center of the recognition region 93 can be made and, in consequence, the recognition region 93 set on the basis of the central laser beams also agrees with a desired recognition area.

However, as mentioned above, the laser beam resolution in the X-axis direction is as extremely high as 0.08 degree, but the laser beam divergence angle in the Y-axis direction is 1.57 degree and the resolution in the Y-axis direction is low. For this reason, the calculation processing for a vertical optical-axis learning angle is conducted in order to recognize the emission angle of the central laser beam in the Y-axis direction with high accuracy. Referring to the flow chart of FIG. 10 and FIGS. 11 and 12, a description will be given hereinbelow of this vertical optical-axis learning angle calculation processing.

First, referring to FIG. 11, a description will be given of the relationship between a mounting height $\Delta Y$ of the laser radar sensor 5 and a reference angle $\Delta A$ forming the Y-axis central laser beam objective. The laser radar sensor 5 is mounted on a lower portion of a bumper or the like of a vehicle, and the mounting height $\Delta Y$ thereof varies according to type of vehicle. At this time, in a case in which the mounting height $\Delta Y$ is low, that is, if the laser radar sensor 5 is mounted at a low position above the ground, it is preferable that the central angle of the Y-axis central laser beam is set so that the Y-axis central laser beam turns upward. On the other hand, if the mounting height $\Delta Y$ thereof is high, it is preferable that the central angle of the Y-axis central laser beam is set so that the Y-axis central laser beam turns horizontally.

Thus, the reference angle at which the central angle of the Y-axis central laser beam aims varies according to the mounting height $\Delta Y$ of the laser radar sensor 5. Therefore, in this embodiment, the reference angle $\Delta A$ is set for each vehicle type. For example, the reference angle $\Delta A$ is set at 0.5 degree in the case of a vehicle type having a low mounting height $\Delta Y$, while the reference angle $\Delta A$ is set at 0 degree for a vehicle type having a high mounting height $\Delta Y$. Moreover, a vertical optical-axis learning angle $\Delta\theta elv$, which will be described later, is calculated as an angular shift indicative of the degree of shifting of the central angle of the Y-axis central laser beam with respect to the reference angle $\Delta A$.

Figure 10:
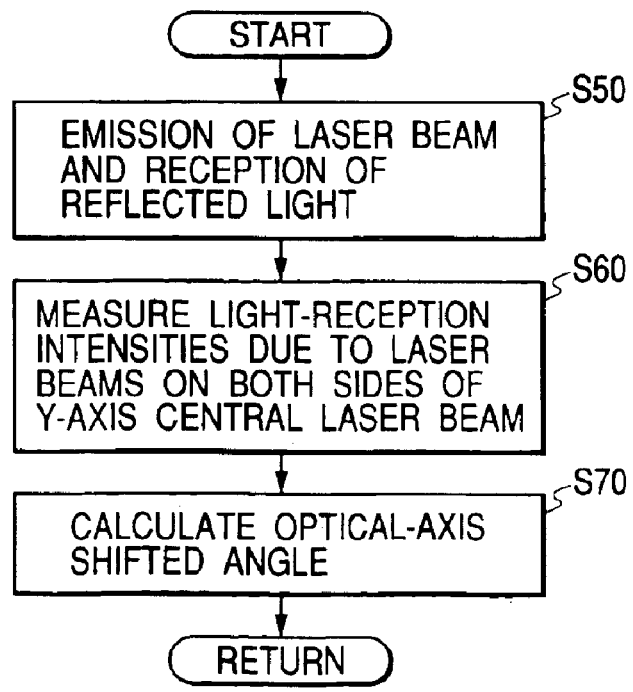
FIG. 10 is a flow chart showing calculation processing for upper and lower optical axis learning angles according to the first embodiment.

After the setting of the recognition region 93, in a step S50 of FIG. 10, a Y-axis central laser beam and laser beams on both the sides with respect to the Y-axis central laser beam are emitted in the vicinity of the center of the recognition area 93 in which the target 100 exists, and the reception of the reflected light thereof takes place. For example, in the case of an example shown in FIG. 12, the Y-axis central laser beam becomes a laser beam having a plane number 5, and the both-side laser beams become laser beams having the plane numbers 4 and 6.

Following this, a step S60 is implemented to measure the light-reception intensity of the reflected light stemming from the laser beams on both sides with respect to the Y-axis central laser beam. For this light-reception intensity measurement, it is possible to use an averaged light-reception intensity obtained by averaging the light-reception intensities of a plurality of laser beams or to use a light-reception intensity of one laser beam directly.

In a step S70, a shifted angle $\Delta\theta elv$ relative to the reference angle $\Delta A$ for the central angle of the Y-axis central laser beam is calculated on the basis of the measured light-reception intensity. That is, in the example shown in FIG. 12, within the laser beam with a plane number 5 which is the Y-axis central laser beam, the shifted angle $\Delta\theta elv$ representative of the degree of shifting of the central angle thereof relative to the reference angle $\Delta A$ is calculated on the basis of the light-reception intensities of the reflected light of the laser beams with the plane numbers 4 and 6. As a concrete calculation method, for example, in a case in which the light-reception intensity on the plane number 4: the light-reception intensity on the plane number 6 is 3:1, (divergence angle 1.57 degree–overlapping range 0.145× 2)×3/(3+1)–0.64 degree=0.32 degree. That is, this calculation result signifies that the central angle of the Y-axis central laser beam is shifted by 0.32 degree to the plane number 4 laser beam side. At this time, if the angle corresponding to the reference angle $\Delta A$ is shifted to the plane number 4 laser beam side, the optical axis of the laser radar sensor 5 takes a downturn and, hence, it is expressed with a minus (–) sign. On the other hand, if it is shifted to the plane number 6 laser beam side, the optical axis of the laser radar sensor 5 takes an upturn and it is expressed with a plus (+) sign.

As a method of calculating the shifted angle $\Delta\theta elv$ relative to the reference angle $\Delta A$, it is also appropriate that, for example, a difference between the light-reception intensities on the plane numbers 4 and 6 is calculated to obtain the shifted angle $\Delta\theta elv$ on the basis of the difference therebetween. Moreover, it is also acceptable that angles relative to the light-reception intensities on the laser beams with the plane numbers 4 and 6 are obtained to calculate the shifted angle $\Delta\theta elv$ by making the subtraction between these angles.

Naturally, an ideal is that the target 100 is set so that the central angle of the Y-axis-direction divergence angle (divergence angular zone) of the laser beam with the plane number 5 is equal to the reference angle $\Delta A$. However, since the laser beam divergence angle in the Y-axis direction is large, even if the position of the target 100 varies within the divergence angle, this variation is not detectable. Therefore, as mentioned above, the vertical optical axis center of the laser beam is calculated in more detail through the use of the light-reception intensities due to the laser beams emitted from both sides with respect to the Y-axis central laser beam. If the central angle of the Y-axis central laser beam divergence angle is shifted from the reference angle $\Delta A$, the shifted angle $\Delta\theta$elv is stored as a vertical optical-axis learning angle.

When the vertical optical-axis learning angle $\Delta\theta$elv is obtained in this way, the recognition on an object such as a preceding vehicle can be made with higher accuracy as will be mentioned later.

After the laser radar sensor 5 sets the recognition region 93 according to the above-mentioned procedure, in actually recognizing an object existing in front of the vehicle, through the laser radar CPU 70, the recognition region 93 is scanned two-dimensionally with laser beams. This two-dimensional scanning provides scan angles $\theta x$, $\theta y$ indicative of scanning directions and a measured distance r. With respect to the two scan angles $\theta x$, $\theta y$, the angle made between a line obtained by projecting the laser beam onto a Y-Z plane and the Z axis is defined as a vertical scan angle $\theta y$, and the angle made between a line obtained by projecting the laser beam onto a X-Z plane and the Z axis is defined as a horizontal scan angle $\theta x$.

The laser radar CPU 70 calculates a distance up to an object as a function of a time difference $\Delta T$ between two pulses PA and PB inputted from the time measuring circuit 89 and produces positional data on the basis of the calculated distance and the corresponding scan angles $\theta x$, $\theta y$. That is, with the center of the laser radar being set as the origin (0, 0, 0), the conversion into X-Y-Z orthogonal coordinates is made in a state where the horizontal (lateral) direction of the vehicle is taken as the X axis, the vertical (height) direction thereof is taken as the Y axis and the forward direction thereof is taken as the Z axis. Moreover, the data (X, Y, Z) on this X-Y-Z orthogonal coordinates conversion and the light-reception signal intensity data (corresponding to the pulse width of the stop pulse PB) are outputted as measurement (range) data to the recognition/inter-vehicle control ECU 3.

The recognition/inter-vehicle control ECU 3 recognizes the object on the basis of the measurement data from the laser radar sensor 5 and outputs drive signals to the brake driver 19, the throttle driver 21 and the automatic transmission controller 23 according to the situation of the preceding vehicle obtained from the recognized object, thereby implementing the so-called inter-vehicle control. Moreover, the alarm decision processing is simultaneously conducted which is for issuing an alarm, for example, when the recognized object resides in a predetermined alarm zone for a predetermined period of time. In this case, for example, the object is a preceding vehicle running in front of this vehicle or a vehicle stopping in front of that vehicle.

Furthermore, referring again to FIG. 1, a description will be given hereinbelow of an internal configuration (control blocks) of the recognition/inter-vehicle control ECU 3.

The measurement data outputted from the laser radar sensor 5 is fed to an object recognition block 43. The object recognition block 43 obtains the central position (X, Y, Z) and the size (W, D, H), such as width, depth and height, of the object on the basis of the three-dimensional positional data obtained as the measurement data. Moreover, the relative speed (Vx, Vy, Vz) of that object with respect to this vehicle is obtained on the basis of the time variation of the central position (X, Y, Z). Still moreover, the object recognition block 43 makes a discrimination as to whether the object is a stopping object or a moving object, on the basis of a vehicle speed (the speed of this vehicle), calculated on the basis of a detection value of the vehicle speed sensor 7 and outputted from a vehicle calculation block 47, and the aforesaid obtained relative speed (Vx, Vy, Vz). An object, which can exert influence on the traveling of this vehicle, is selected on the basis of the discrimination result and the central position of the object and the distance up to this vehicle is displayed on the distance indicator 15.

In addition, a steering angle calculation block 49 calculates a steering angle on the basis of a signal from the steering sensor 27, and a yaw rate calculation block 51 calculates a yaw rate on the basis of a signal from the yaw rate sensor 28. Moreover, a curve radius (radius of curvature) calculation block 57 calculates a curve radius (radius of curvature) on the basis of the vehicle speed from the vehicle speed calculation block 47, the steering angle from the steering angle calculation block 49 and the yaw rate from the yaw rate calculation block 51. Still moreover, the object recognition block 43 calculates a vehicle shape probability or its own lane probability on the basis of the curve radius R, the central position coordinates (X, Z) and the like. A description about these vehicle shape probability and lane probability will be given later.

A model of the object having such data will be referred to as a "target model". A sensor abnormality detection block 44 detects whether or not the data obtained in the object recognition block 43 is a value falling within an abnormal range. If it is within the abnormal range, this fact is displayed on the sensor abnormality indicator 17.

On the other hand, a preceding vehicle decision block 53 selects a preceding vehicle on the basis of various data obtained from the object recognition block 43 and obtains a distance Z to the preceding vehicle and a relative speed Vz thereto. Moreover, on the basis of the distance Z from the preceding vehicle, the relative speed Vz thereto, a setting state of the cruise control switch 26, a pressing state of the brake switch 9, an opening degree from the throttle opening degree sensor 11 and a sensitivity set value from the alarm sensitivity setting device 25, an inter-vehicle control/alarm decision unit 55, in the case of the alarm decision, makes a decision on whether or not to issue an alarm and, in the case of the cruise decision, determines the contents of the vehicle speed control. If the result shows that the alarm is necessary, an alarm issuing signal is outputted to the alarm sound generator 13. On the other hand, in the case of the cruise decision, control signals are outputted to the automatic transmission controller 23, the brake driver 19 and the throttle driver 21 to carry out the necessary control. Moreover, at the implementation of these control, a needed display signal is outputted to the distance indicator 15 to notify the situation to the vehicle driver.

Such inter-vehicle control or alarm decision are premised on the object recognition. In more detail, an important factor is to appropriately carry out the recognition of the vehicle forming an object of recognition. Therefore, a description will be given hereinbelow of the processing for the object recognition to be implemented in the object recognition block 43 of the recognition/inter-vehicle control ECU 3 for the appropriate vehicle recognition.

Figure 13A:
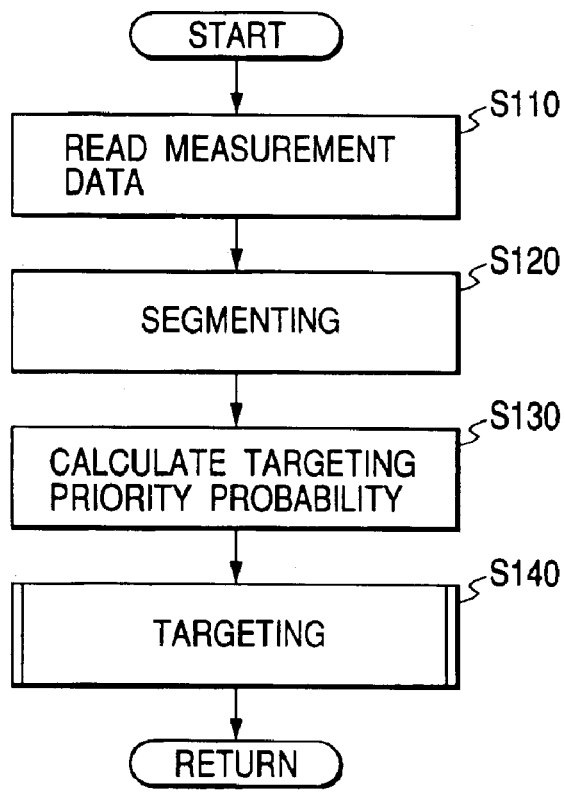
FIG. 13A is a flow chart showing object recognition processing according to the first embodiment.

FIG. 13A is a flow chart showing main processing for the object recognition.

In FIG. 13A, a step S110 is implemented to read measurement data corresponding to one scan from the laser radar sensor 5. In the laser radar sensor 5, the scan cycle is, for example, 100 msec, and the data is read at an interval of 100 msec.

In a step S120, data are segmented. As mentioned above, the three-dimensional positional data acquired as the measurement data are grouped to form segments. For this segmenting, data satisfying a predetermined connection condition (unification condition) are collected to produce one presegment data, and of the presegment data, data satisfying a predetermined connection condition (unification condition) are collected to produce one definitive segment data. For example, the presegment data is obtained in a manner such that, with respect to data point-recognized, the point sets are unified when satisfying two conditions that the distance ΔX in the X-axis direction is below 0.2 m and the distance ΔZ in the Z-axis direction is below 2 m. In this embodiment, there are three scanning lines in the Y-axis direction and, through the presegmenting, the presegment data are produced for each line. Therefore, for definitive-segmenting, the presegment data close to each other in a three-dimensional (X, Y, Z) space are unified (definitive-segmenting). Each of the definitive segment data forms a rectangular parallelepiped region having three edges in parallel along the X axis, the Y axis and the Z axis, and the center coordinates (X, Y, Z) thereof and the lengths (W, H, D) of the three edges representative of the size are used as the data contents. Incidentally, unless otherwise specified particularly, the definitive segment (data) will be referred to simply as "segment (data)".

In a step S13, each segment data is set as a pretarget, and with respect to each pretarget, a targeting priority probability, which is a probability of the object of targeting processing as a target model, is calculated. In this case, the target model is a model of an object to be produced with respect to a group of segments, and the pretarget is a candidate for a target model undergoing the targeting processing. In this embodiment, a maximum of 18 pretargets can be selected, and for the target model, of the pretargets, four pretargets are selected in the order of decreasing targeting priority probability.

As the decision factors, considering whether the vehicle shape probability falls below a predetermined probability (for example, 50%), whether it is a moving object, whether the lateral distance relative to this vehicle falls below a predetermined distance (for example, 6 m in each of right and left directions), whether the detection continues for a predetermined period of time, and the like, the targeting priority probability of each pretarget is calculated to become higher as the number of the applicable items increases.

A description will be given hereinbelow of the vehicle shape probability.

In a case in which a large number of delineators are installed at a short interval along a roadside or when a guard rail is detected, there is a possibility that these stationary objects are recognized as a moving matter in error. This is because, when something is always detected at the same position, a decision is made that a vehicle running at the same speed as that of this vehicle exists at that position. Therefore, the vehicle shape probability is calculated in order to prevent an object recognized as a moving object in error from being judged as a preceding vehicle in error. In the preceding vehicle decision block 53, if a decision indicative of a roadside matter is made when the vehicle shape probability is below 50%, it is possible to prevent a repeatedly appearing stationary matter from being judged as a preceding vehicle in error.

The range the vehicle shape probability can take is 0 to 100%, and for reducing the influence of instantaneous noise and dispersion, the vehicle shape probability is calculated through the weighted mean according to an equation (1).

$$\text{present vehicle shape probability} \leftarrow \text{last value} \times \alpha + \text{present instantaneous value} \times (1-\alpha) \quad (1)$$

The initial value is set at 50%, and α is set at, for example, 0.8. Moreover, the instantaneous value of the vehicle shape probability is calculated on the basis of the relative speed, the vertical and horizontal lengths D and W, the detection time, and the like. Incidentally, the method of calculating this vehicle shape probability is described in detail in Japanese Paten Laid-Open No. 2002-40139 (paragraph No. 0045 to 0049), and the further description will be omitted for brevity.

Figure 13B:
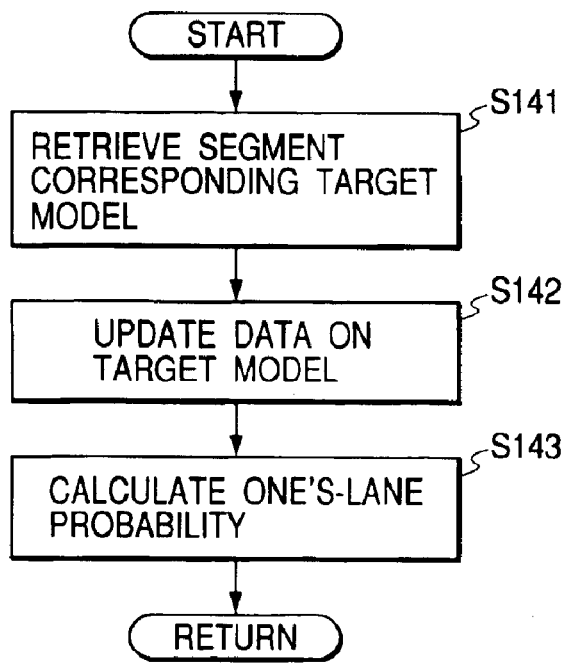
FIG. 13B is a flow chart showing targeting processing to be implemented in the flow chart shown in FIG. 13A.

In a step S140, four pretargets having a higher targeting priority probability are selected as targets which, in turn, are subjected to the targeting processing. This targeting processing will be described hereinbelow with reference to a flow chart of FIG. 13B. In the targeting processing, first, a corresponding segment of a target model is retrieved (step S141). This is the processing for retrieving which of the currently detected segments the target model obtained previously agrees with, and the segment corresponding to the target model is defined as follows. First, assuming that the target model has moved from the position at the time of the last processing at the relative speed at the time of the last processing, a presumed position of the current target model is calculated. Subsequently, a presumed movement range having a predetermined width in each of the X-axis, Y-axis and Z-axis directions is set around the presumed position. Moreover, a segment which is at least partially included in the presumed movement range is set as a corresponding segment.

In a step S142, the data updating processing is conducted with respect to the target mode. According to this processing, if there is a corresponding segment, the past data on the target model is updated on the basis of the present data, and the data to be updated are the central coordinates (X, Y, Z), the width W, the height H, the depth D, the relative speeds (Vx, Vy, Vz) in the X-axis, Y-axis and Y-axis directions, the four-times central coordinates (X, Y, Z) data taken in the past, the one's-lane probability, and the like. In this connection, if there is no corresponding segment, the data updating on the target model is not made, and a new target model is registered.

Following this, the one's-lane probability is calculated in a step S143. The one's-lane probability is a parameter indicative of the degree of certainty that the target model is a vehicle running on the same lane as this vehicle. Concretely, the position of the target model is calculated and the calculated position is put on a one's-lane probability map to obtain an instantaneous value of the one's-lane probability of the target model. In this case, the one's-lane probability map is a map in which a predetermined range (for example, 5 m in each of right and left directions and 100 m ahead) in front of this vehicle is divided into a plurality of regions and a probability is allocated to each region so that the probability becomes higher as the distance thereto becomes shorter or it becomes closer to the course of this vehicle.

After the calculation of the instantaneous value of the one's-lane probability, the one's-lane probability is obtained through the weighted mean according to the equation (2).

$$\text{one's-lane probability} \leftarrow \text{last value of one's-lane probability} \times \alpha + \text{instantaneous value of one's-lane probability} \times (1-\alpha) \quad (2)$$

In this case, α can be a constant value, or it can also be a value varying in accordance with the distance from the target model or a region in which the target model exists. Incidentally, the method of calculating the one's-lane probability is described in detail in Japanese Patent Laid-Open No. 2002-40139 (paragraph no. 0050 to 0056), and the further description thereof will be omitted for simplicity.

The data on the target model, including the vehicle shape probability and the one's-lane probability, is outputted from the object recognition block 43 to the preceding vehicle decision block 53 in FIG. 1. The preceding vehicle decision block 53 makes a decision that, of the target models whose vehicle shape probability exceeds a predetermined threshold (for example, 50%) and whose one's-lane probability exceeds a predetermined threshold (for example, 50%), the target model having the shortest distance Z is a preceding vehicle. This decision result is outputted to the inter-vehicle control/alarm decision unit 55.

Secondly, a description will be given hereinbelow of the learning processing on the optical-axis center of the laser radar sensor 5.

Even if, through the use of the target 100, the emission angle of the central laser beam in the recognition area 93 is set to agree with the reference angle ΔA, the actual laser beam emission range varies due to various factors. For example, due to the loading state of the vehicle, the number of passengers, or the like, particularly, in the Y-axis direction (vertical direction), the laser beam emission range of the laser radar sensor 5 can shift from the range set as the recognition area 93. Moreover, when the vehicle runs repeatedly, the mounting state of the laser radar sensor 5 on the vehicle can vary because of being affected by the running vibrations and the like. Thus, in particular, since the laser beam emission angle in the Y-axis direction tends to vary, a decision is made as to whether the vertical optical-axis learning angle Δθelv calculated on the basis of the predetermined target 100 as mentioned above is shifted or not. If shifted, it is preferable that the correction is not done.

In this embodiment, the learning of the optical axis center of the laser radar sensor 5 is made through the use of a reflector always mounted on a vehicle. This is because the reflector of the passenger car is placed at a position remote by approximately 75 cm above the ground and the difference in mounting height among vehicle types is small.

Figure 14:
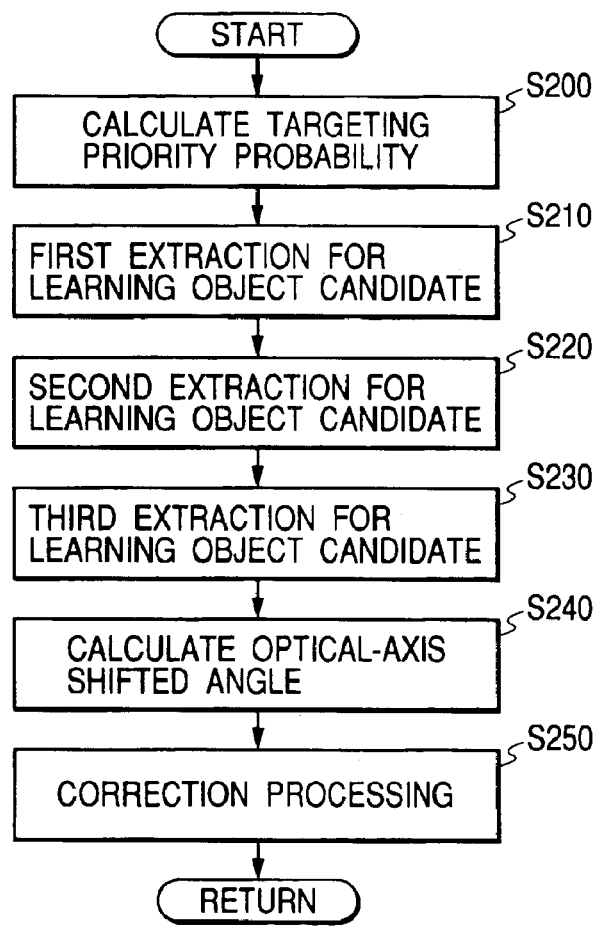
FIG. 14 is a flow chart showing optical axis based learning processing in the laser radar sensor according to the first embodiment.

FIG. 14 is a flow chart showing learning processing on the optical axis center of the laser radar 5. First of all, in a step S200, the targeting priority probability is calculated with respect to a plurality of pretargets. This targeting priority probability calculating method is basically similar to that in the step S130 of the flow chart of FIG. 13A described above.

However, in this learning processing, a discrimination between a vehicle and an object other than vehicles is made in more detail through the use of the vertical optical-axis learning angle Δθelv, and the targeting priority probability on the pretarget other than vehicles is limited to a predetermined low probability (for example, 20%). A description will be given hereinbelow of a method of making a discrimination between a vehicle and a pretarget other than vehicles through the use of the vertical optical-axis learning angle Δθelv. This discrimination method is applied to the step S130 of the flow chart of FIG. 13A, and the targeting priority probability of a pretarget other than vehicles can be limited to the predetermined low probability.

First, the optical-axis upturn decision or downturn decision is made by comparing the vertical optical-axis learning angle Δθelv with an upturn decision angle (for example, +0.5 degree) and a downturn decision angle (for example, −0.5 degree). That is, the decision indicative of the upturn is made if the vertical optical-axis learning angle Δθelv≧+0.5 degree, while the decision indicative of the downturn is made if the vertical optical-axis learning angle Δθelv≦0.5 degree.

In addition, in the case of the optical-axis upturn decision, the targeting priority probability on the pretarget satisfying the following condition (1) or (2) is limited to a predetermined low probability. The example shown in FIG. 11 will properly referred to in explaining the respective conditions.

(1) The reflected light due to only the laser beam positioned on the lower side with respect to the Y-axis central laser beam is received, and the distance Z (cm) from a pretarget>the mounting height ΔY (cm)×40+D (cm) comes into existence.

Figure 11:
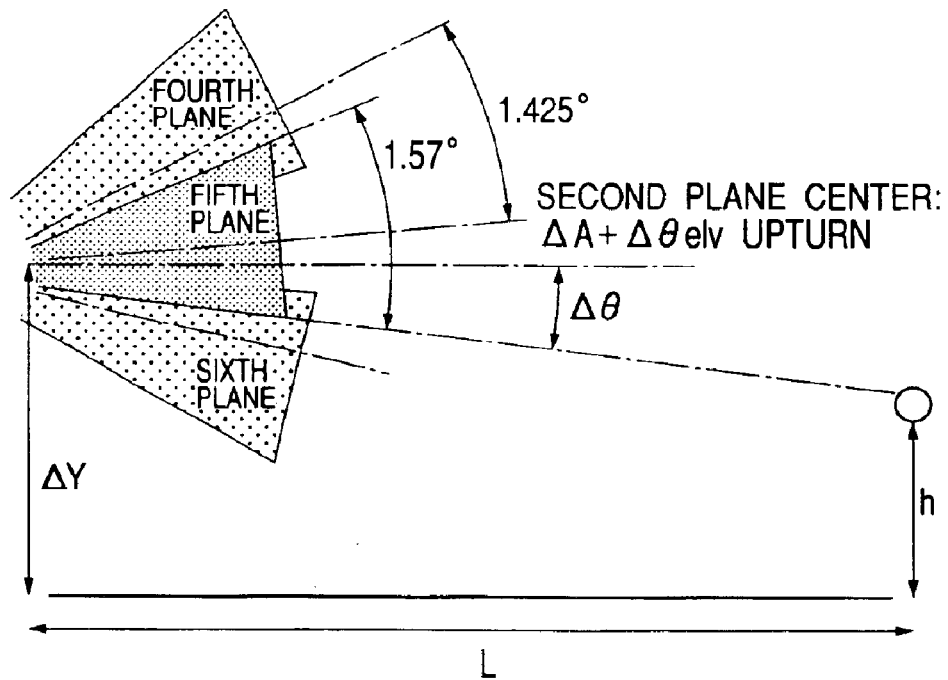
FIG. 11 is an illustration for explaining the relationship between a mounting height of the laser radar sensor and a reference angle forming a target angle for a Y-axis central laser beam according to the first embodiment.
Figure 12:
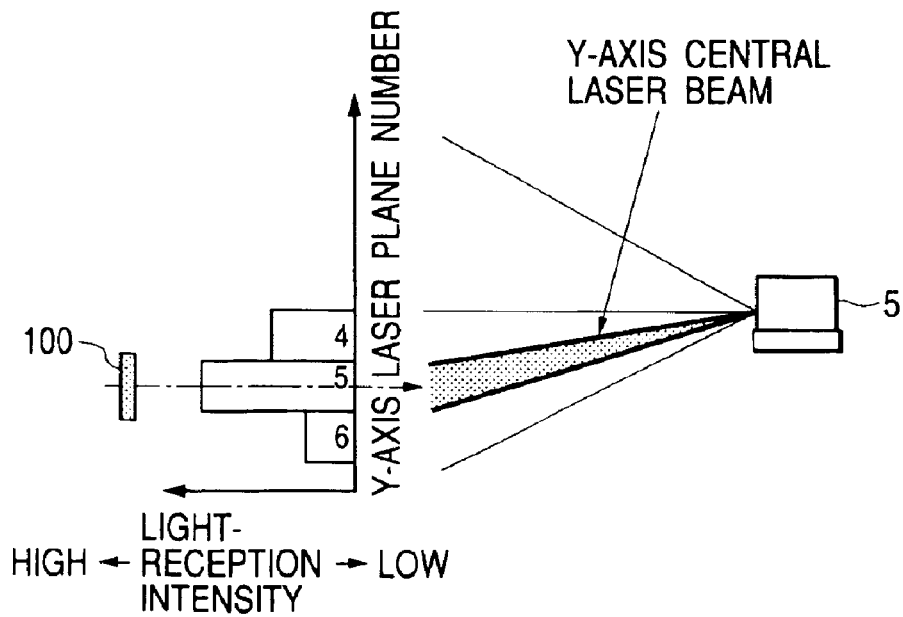
FIG. 12 is an illustration for explaining a method of calculating a shifting angle of a central angle of a Y-axis central laser beam from the reference angle according to the first embodiment.

As shown in FIG. 11, in this embodiment, the divergence angle of the laser beam in the Y-axis direction is 1.57 degree, and tan (1.57 degree) is approximately equal to 1/37. Moreover, the divergence angle of only the lower-side laser beam relative to the central laser beam, that is, the divergence angle of the laser beam except the overlapping regions is 1.57−0.145=1.425 degree, and tan (1.425 degree) is approximately equal to 1/40.

In this case, in principle, the lower-side laser beam (sixth-plane laser beam) relative to the Y-axis central laser beam is emitted to turn downward. However, in the case of the optical-axis upturn decision, the upper end of the sixth laser beam can take a substantially horizontal state. Even in such a case, when the distance Z from the pretarget satisfies the aforesaid equation, the lower end of the sixth-plane laser beam reaches at least a road surface. Moreover, since the sixth-plane laser beam produces reflected light while the fifth-plane laser beam, which is the Y-axis central laser beam, does not produce reflected light, it can be considered that the pretarget producing that reflected light is on a road surface or at a position extremely close to the road surface. Therefore, it is presumed that this pretarget is an object other than vehicles, for example, a delineator or the like.

In the aforesaid equation, D (cm) is an allowance set, for example, in consideration of a range error and a slope of a road, and is set at, for example, 500 (cm).

(2) The reflected light due to the upper-side laser beam relative to the Y-axis central laser beam, or due to both the Y-axis central laser beam and the upper-side laser beam relative thereto, is received, and the distance Z (cm) to the pretarget>(350 (cm)−ΔY (cm))×37+D (cm) is valid.

In the case of a decision to the optical-axis upturn, as mentioned above, the lower end of the Y-axis central laser beam can approach a substantially horizontal state. Accordingly, in the example shown in FIG. 11, the fifth-plane laser beam, which is the Y-axis central laser beam, and the fourth-plane laser beam on the upper side of the fifth-plane laser beam are emitted in a direction of diverging (spreading out) upwardly. A large number of objects such as marks and signboards are located above a road, and the reception of the reflected light of the fourth- and fifth-plane laser beams, diverging upwardly, from these objects tend to take place. The aforesaid condition (2) comes into existence in a case in which there is a possibility that the reflected light from the objects above a road are received.

That is, for example, even in the case of a high vehicle such as a truck, the maximum value of the vehicle height is approximately 350 (cm). Therefore, the reflection of the fourth- and fifth-plane laser beams occurs, and when the distance Z up to the pretarget which has produced the reflected light is longer than the distance at which the emission height of the fifth-plane laser beam (Y-axis central laser beam) exceeds 350 (cm), the possibility that it is the reflected light from an object other than vehicles becomes high. Therefore, in such a case, limitation is imposed on the targeting priority probability of the pretarget. Incidentally, a case in which the reflected light occurs due to only the fourth-plane laser beam is handled in like manner.

Furthermore, a description will be given hereinbelow of the optical-axis downturn decision. In the case of the optical-axis downturn decision, when the following condition (3) or (4) comes into existence, the targeting priority probability on the pretarget is limited to a predetermined low probability.

(3) The reception of the reflected light due to the lower-side laser beam relative to the Y-axis central laser beam, or due to both the Y-axis central laser beam and the lower-side laser beam relative thereto, takes place, and the distance Z (cm) to the pretarget>$\Delta Y$ (cm))×37+D (cm) holds.

In the case of the optical-axis downturn decision, contrary to the optical-axis upturn decision, the upper end of the Y-axis central laser beam can approach a horizontal state. Accordingly, in the example shown in FIG. 11, the fifth-plane laser beam, which is the Y-axis central laser beam, and the sixth-plane laser beam on the lower side relative thereto are emitted to diverge downwardly, and the reflected light from a read surface or an object existing at a low position above a road surface becomes easy to receive. The aforesaid condition (3) comes into existence in a case in which there is a possibility of the reception of the reflected light from a read surface or an object existing at a low position above a road surface.

That is, since the divergence angle of the laser beam is 1.57 degree as mentioned above, the distance at which the fifth-plane laser beam (Y-axis central laser beam) substantially reaches a road surface is calculated by multiplying the value of tan (1.57 degree) by the mounting height $\Delta Y$ of the laser radar sensor 5. In a case in which the distance Z up to the pretarget is longer than the distance obtained by adding the allowance D (cm) to the calculated distance and the reception of the reflected light of both the fifth- and sixth-plane laser beams or only the sixth-plane laser beam takes place, we can presume that the reflection occurs from an extremely low position above a road surface. Therefore, in such a situation, limitation is imposed on the targeting priority probability of the pretarget.

(4) The reception of the reflected light stemming from only the upper-side laser beam relative to the Y-axis central laser beam takes place, and the distance Z (cm) to the pretarget>(350 (cm)–$\Delta Y$ (cm))×40+D (cm) comes into existence.

In the case of the optical-axis downturn decision, although the upper-side laser beam (fourth-plane laser beam) relative to the Y-axis central laser beam turns upwardly with respect to a horizon, it is emitted in a direction relatively close to a horizontal direction. Also in such a case, if the distance Z to the pretarget satisfies the aforesaid equation, the upper end of the fourth-plane laser beam reaches a height exceeding at least the highest vehicle height. Moreover, since the reflected light appears in connection with the fourth-plane laser beam and no reflected light appears in conjunction with the fifth-plane laser beam (Y-axis central laser beam), we can presume that the pretarget producing the reflected light is at an extremely high position above a road surface. Therefore, the condition (4) comes into existence, it can be considered that there is a possibility of the pretarget being an object, such as mark or signboard, other than vehicles.

Furthermore, in addition to the above-mentioned conditions (1) to (4), it is also appropriate that the targeting priority probability of the pretarget is limited when the following condition holds.

(5) As shown in FIG. 11, the angle $\Delta\theta$ made between the horizontal direction and the lower end of the fifth-plane laser beam is larger than a predetermined angle $\Theta$, and the distance from the pretarget is shorter than a predetermined short distance 1 (for example, 30 m), and the width of the pretarget is shorter than the width of the vehicle (for example, below 0.5 m), and the reception of the reflected light due to only the sixth-plane laser beam takes place.

A description will be given hereinbelow of a method of setting the aforesaid predetermined angle $\Theta$. A reference emission (radiation) height h of the lower end of the fifth-plane laser beam (Y-axis central laser beam) at a predetermined short distance L is first determined (for example, 30 cm above the ground), and the predetermined angle $\Theta$ is calculated as a function of the reference emission height h according to the following equation (3).

$$\Theta = \tan^{-1} (\Delta Y - h)/L \tag{3}$$

When the angle $\Delta\theta$ made between the horizontal direction and the lower end of the fifth-plane laser beam exceeds the predetermined angle $\Theta$ set in this way, as mentioned above, the reference emission height h is set at a relatively low position and, hence, an object existing 30 cm above the ground is covered with the fifth-plane laser beam emission range when the distance exceeds the distance L. In other words, in a case in which the reflected light occurs in connection with only the sixth-plane laser beam within a range of the distance L, the height of that reflecting object is at most approximately the reference emission height h.

On the other hand, when the reflecting object is a vehicle and comes within a range of a predetermined short distance, its height exceeds the reference emission height h and the reception of the reflected light therefrom should take place by even the fifth-plane laser beam.

Accordingly, when the aforesaid condition holds, it can be considered that the reflecting object (pretarget) is an object, such as delineator, other than vehicles and, hence, the targeting priority probability is limited to a predetermined low probability.

In this connection, although the aforesaid condition (5) includes, as one condition satisfying element, that the pretarget has a width smaller than a predetermined width, this is for the purpose of confirmation, and this element is omissible.

After the targeting priority probability is calculated with respect to each pretarget in this way, in a step S210 of the flow chart of FIG. 14, the first extraction is made with respect to the learning object candidates. In this first extraction, the pretarget is recognized as a moving object and the recognition continues over a predetermined period of time (for example, 5 seconds), and of the pretargets whose vehicle shape probability exceeds 50%, a pretarget having the highest targeting priority probability is determined as a learning object candidate. Accordingly, since the targeting priority probability is suppressed to a low value with respect to the pretargets applying to the above-mentioned conditions (1) to (5), the possibility that they are selected as a learning object candidate for a vehicle becomes extremely low.

Following this, the second extraction is conducted in a step S220. In this second extraction, a decision is made as to whether or not a situation in which the lateral relative speed Vx between the learning object candidate selected in the first extraction and this vehicle (his/her own vehicle) is below a predetermined speed (for example, 0.2 m/s) and the forward (longitudinal) relative speed Vz is also below a predetermined speed (for example, 0.1 m/s) continues for a predetermined period of time. That is, this decision is for checking whether or not the relative positional relationship between the learning object candidate and this vehicle is substantially stable. This is because the range error of the learning object candidate becomes small. When a state in which both the lateral relative speed Vx and forward relative speed Vz are below a predetermined speed (for example, 0.1 m/s) continues for a predetermined period of time, it becomes the learning object candidate in the second extraction.

Moreover, the third extraction of the learning object candidate is made in a step S230. In this third extraction, with respect to the learning object candidate, a decision is made as to whether or not its width falls within a predetermined range (for example, a range from 1.2 m to 2.1 m) and the distance Z from the learning object candidate falls within a predetermined range (for example, a range from 30 m to 80 m).

The reason for the decision on the width of the learning object candidate is that, in this embodiment, a passenger car having a reflector substantially standardized in height is selected as a learning object candidate. Moreover, the reason for the decision on the distance Z from the learning object candidate is that, if this vehicle becomes too close to the learning object candidate, the light-reception intensity increases due to the reflection from a body other than the reflector and, hence, the reflector become hard to identify while, if the distance therebetween becomes too long, the light reception state becomes unstable, which can lead to the error learning.

When the decision shows that each of the width and the distance Z enters the predetermined range, it is determined as a learning object candidate through the third extraction. Moreover, in a step S240, a vertical optical-axis shifted angle instantaneous value θu is calculated through the use of the learning object candidate selected through the first to third extraction processing. The calculation of this vertical optical-axis shifted angle instantaneous value θu is made according to the following equation (4).

$$\theta u[LSB=0.01\ degree] = (\text{reflector detection plane number} - 5) \times 1.425\ [degree] - \Delta A[degree] + \tan^{-1}(75\ [cm] - \Delta Y[cm])/Z[cm] \quad (4)$$

Figure 15:
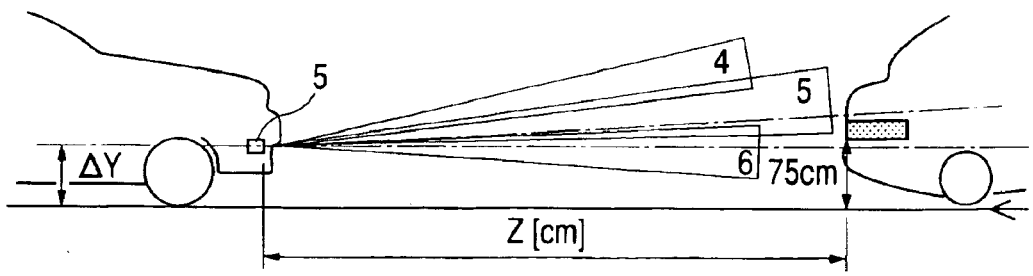
FIG. 15 is an illustration for explaining a detection plane number of a reflector.

In this equation (4), as shown in FIG. 15, the reflector detection plane number signifies the plane number of a laser beam which produces the reflected light from a reflector mounted on a passenger car which is a learning object candidate. In this embodiment, among the detection plane numbers, there are 4 (upper plane), 4.5 (intermediate plane between upper plane and middle plane), 5 (middle plane), 5.5 (intermediate plane between middle plane and lower plane) and 6 (lower plane), and one of these numbers is taken. In the example shown in FIG. 15, the reflector detection plane number is 5.5 (intermediate plane between middle plane and lower plane).

According to the equation (4), the vertical optical-axis shifted angle instantaneous value θu can be calculated which is indicative of the degree of shifting of the central angle of the divergence angle of the laser beam with the plane number 4, which forms the Y-axis central laser beam, from the reference angle ΔA.

In addition, on the basis of whether or not the vertical optical-axis shifted angle instantaneous value θu calculated according to the equation (4) falls within, for example, a range of ±1.42 degree, a decision is made as to whether or not the vertical optical-axis shifted angle instantaneous value θu is a normal value. At this time, if the decision shows an abnormal value, the vertical optical-axis shifted angle instantaneous value θu is canceled to take a non-calculated state.

On the other hand, if the decision indicates a normal value, the number Nu of times of calculation of the vertical optical-axis shifted angle instantaneous value θu is incremented as expressed by the following equation (5), and the sum total of the vertical optical-axis shifted angle instantaneous values θu are calculated as indicated by the following equation (6).

$$Nu = Nu + 1 \quad (5)$$

$$\sum^{Nu} \theta u = \sum^{Nu} \theta u + \theta u \quad (6)$$

Still additionally, at the time that the number Nu of times of calculation of the vertical optical-axis shifted angle instantaneous value θu reaches a predetermined number of times (for example, 20 times), the average value θuave of the vertical optical-axis shifted angle instantaneous values θu is calculated as expressed by the following equation (7).

$$\theta uave = \sum^{Nu} \theta u / Nu \quad (7)$$

Concurrently with the calculation of the average value θuave, each of the number Nu of times of calculation thereof and the sum total Σθu thereof is initialized to zero.

Thereafter, in a step S250, the vertical optical-axis learning angle Δθelv is corrected on the basis of the average value θuave of the vertical optical-axis shifted angle instantaneous values θu. Concretely, in order to prevent a rapid variation of the vertical optical-axis learning angle Δθelv, the average value θuave of the vertical optical-axis shifted angle instantaneous values θu is compared with a value obtained by adding 0.05 degree to the vertical optical-axis learning angle Δθelv and a value obtained by subtracting 0.05 degree from the vertical optical-axis learning angle Δθelv. If the comparison result shows that the average value θuave is larger than a value obtained by adding 0.05 degree to the vertical optical-axis learning angle Δθelv, 0.05 degree is added to the vertical optical-axis learning angle Δθelv. On the other hand, If the comparison result shows that the average value θuave is smaller than a value obtained by subtracting 0.05 degree from the vertical optical-axis learning angle Δθelv, 0.05 degree is subtracted from the vertical optical-axis learning angle Δθelv. In this way, the vertical optical-axis learning angle Δθelv is corrected while a variation of the vertical optical-axis learning angle Δθelv is limited to a predetermined angle (0.05 degree).

Thus, even in a case in which, due to the loading state, the number of passengers or the like, particularly in the Y-axis (vertical) direction, the laser beam emission angle of the laser radar sensor 5 is shifted from the initially set angle (vertical optical-axis learning angle Δθelv), the appropriate correction is feasible.

(Second Embodiment)

Referring to the drawings, a description will be given hereinbelow of an inter-vehicle distance control unit according to a second embodiment of the present invention. This control unit is mounted on a vehicle and is designed to keep a predetermined inter-vehicle distance when capturing a preceding vehicle during constant-speed travel control.

Figure 16:
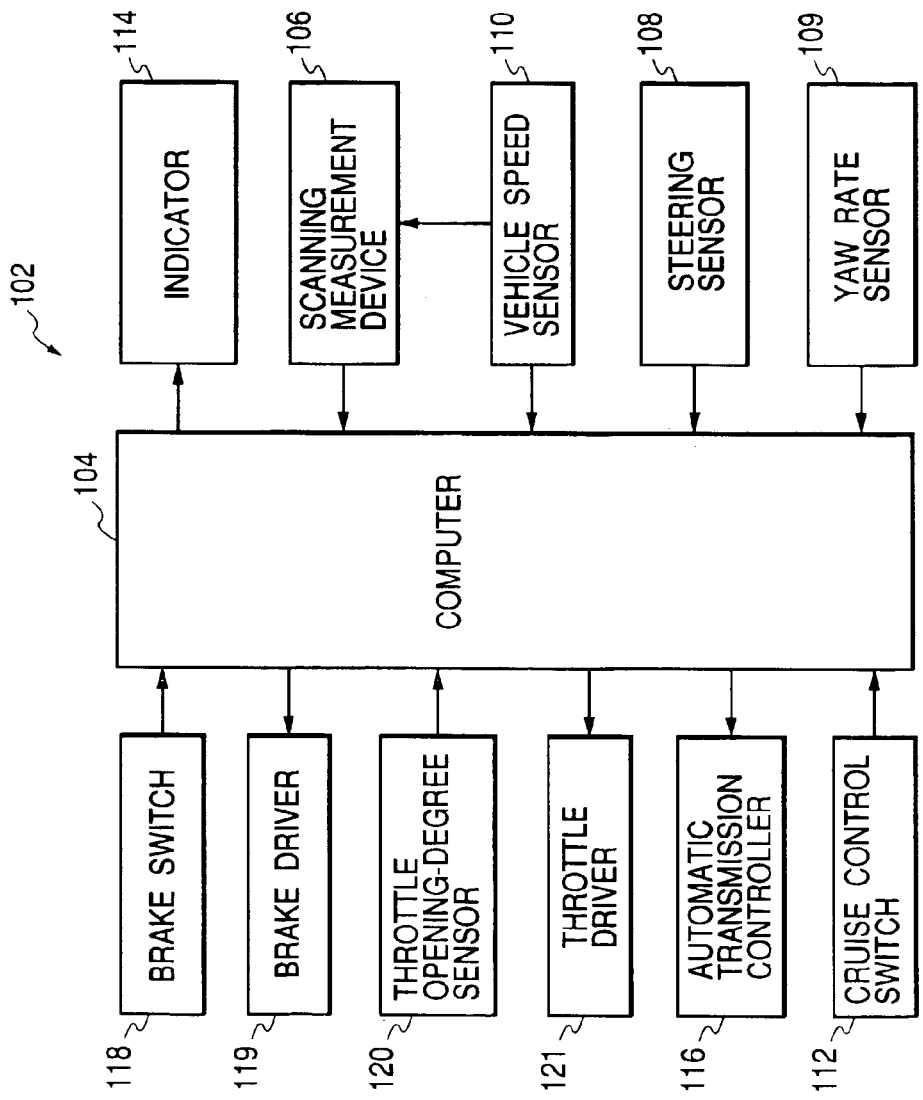
FIG. 16 is an illustration of the entire configuration of an inter-vehicle distance control unit according to a second embodiment of the present invention.

FIG. 16 is an illustration of the entire configuration of an inter-vehicle distance control unit according to the second embodiment. In FIG. 16, the inter-vehicle distance control unit, generally designated at reference numeral 102, is made up of, in addition to a computer 104 which functions as a principal component, a scanning measurement device 106, a steering sensor 108, a yaw rate sensor 109, a vehicle speed sensor 110, a cruise control switch 112, an indicator 114, an automatic transmission controller 116, a brake switch 118, a brake driver 119, a throttle opening degree sensor 120 and a throttle driver 121.

The computer 104 includes an input/output interfaces (I/O) and various types of drive circuits. This hardware configuration is of a general type, and a detailed description will be omitted for simplicity. This computer 104 is designed to carry out inter-vehicle distance control for controlling an inter-vehicle distance with respect to a preceding vehicle and to, when a preceding vehicle is not selected, implement constant-speed travel control for controlling his/her own vehicle (one's vehicle) so that its speed becomes a set speed.

The scanning measurement (range) device 106 includes a transmission/reception unit (not shown) and a distance/angle calculation unit (not shown), and the transmission/reception unit emits (radiates) a plurality of laser beams in a forward direction of the one's vehicle in a predetermined angular range and detects the reflected light thereof, and the distance/angle calculation unit detects, on the basis of a time from the emission of the laser beam to the capture of the reflected light thereof, a distance from a preceding vehicle forming a reflecting object in a forward direction of the one's vehicle and an emission angle of the laser beam. Incidentally, as the scanning measurement device 106, it is also appropriate to employ a device using, instead of the laser beam, an electric wave such as microwave, an ultrasonic wave, or the like.

The steering sensor 108 is for detecting a variation of a steering angle of a steering wheel and is for detecting a relative steering angle on the basis of the variation detection value. The steering angle of the steering wheel is referred to in detecting curve data. The yaw rate sensor 109 is for detecting an angular velocity around the one's vehicle in its vertical direction, the detection value is referred to in calculating the curve data.

The vehicle speed sensor 110 is for detecting a signal corresponding to a rotational speed of a wheel. The cruise control switch 112 includes five push-bottom switches: a main SW (switch), a set SW, a resume SW, a cancel SW and a tap SW.

The main SW is for permitting the start of the cruise control (constant-speed travel control). The inter-vehicle distance control can be implemented even during the constant-speed travel control. The set SW, when pressed, takes in a vehicle speed Vn of the one's vehicle at that time so that the vehicle speed Vn is stored as a target (desired) speed Vm. The constant-speed travel control is executed after the setting of the target speed Vm.

The resume SW, when pressed when the target vehicle speed Vm is stored in a state other than the constant-speed travel control, returns the speed of the one's vehicle from the present vehicle speed to the target vehicle speed Vm. The cancel SW is for suspending the constant-speed travel control being in implementation and, when pressed, the suspending processing is conducted. The tap SW is for setting a target inter-vehicle distance with respect to a preceding vehicle, which will be described later, and the distance can be set in a predetermined range to meet the user's preferences.

The indicator 114 includes a set vehicle speed indicator, an inter-vehicle distance indicator, a set inter-vehicle time indicator and a sensor abnormality indicator, which are not shown. The set vehicle speed indicator indicates a set vehicle speed in the constant-speed control, and the inter-vehicle distance indicator indicates an inter-vehicle distance relative to a preceding vehicle selected through processing, which will be mentioned later, on the basis of a measurement result in the scanning measurement device 106. The set inter-vehicle time indicator indicates an inter-vehicle time set as a time for controlling the inter-vehicle distance through processing which will be mentioned later, and the sensor abnormality indicator, when an abnormality occurs in various types of sensors such as the scanning measurement device 106, indicates the occurrence of the abnormality.

The automatic transmission controller 116 is for selecting a gear position of an automatic transmission, required for the control of the speed of the one's vehicle, in response to an instruction from the computer 104. The brake switch 118 detects the pressing of the brake pedal by the driver, and brake driver 119 adjusts the braking pressure in accordance with an instruction from the computer 104.

The throttle opening-degree sensor 120 detects the opening degree of the throttle valve, and the throttle driver 121 adjusts the opening degree of the throttle valve in accordance with an instruction from the computer 104 to control the output of the internal combustion engine. Incidentally, for example, by making a comparison between the throttle opening degree and the vehicle speed, a decision can be made on downward slope.

The computer 104 includes a power supply SW (not shown) and, when this power supply SW is pressed, the power supply takes place to start predetermined processing. The computer 104 implements the inter-vehicle distance control processing or constant-speed travel control processing, which will be described later, through the use of this configuration.

Figure 17:
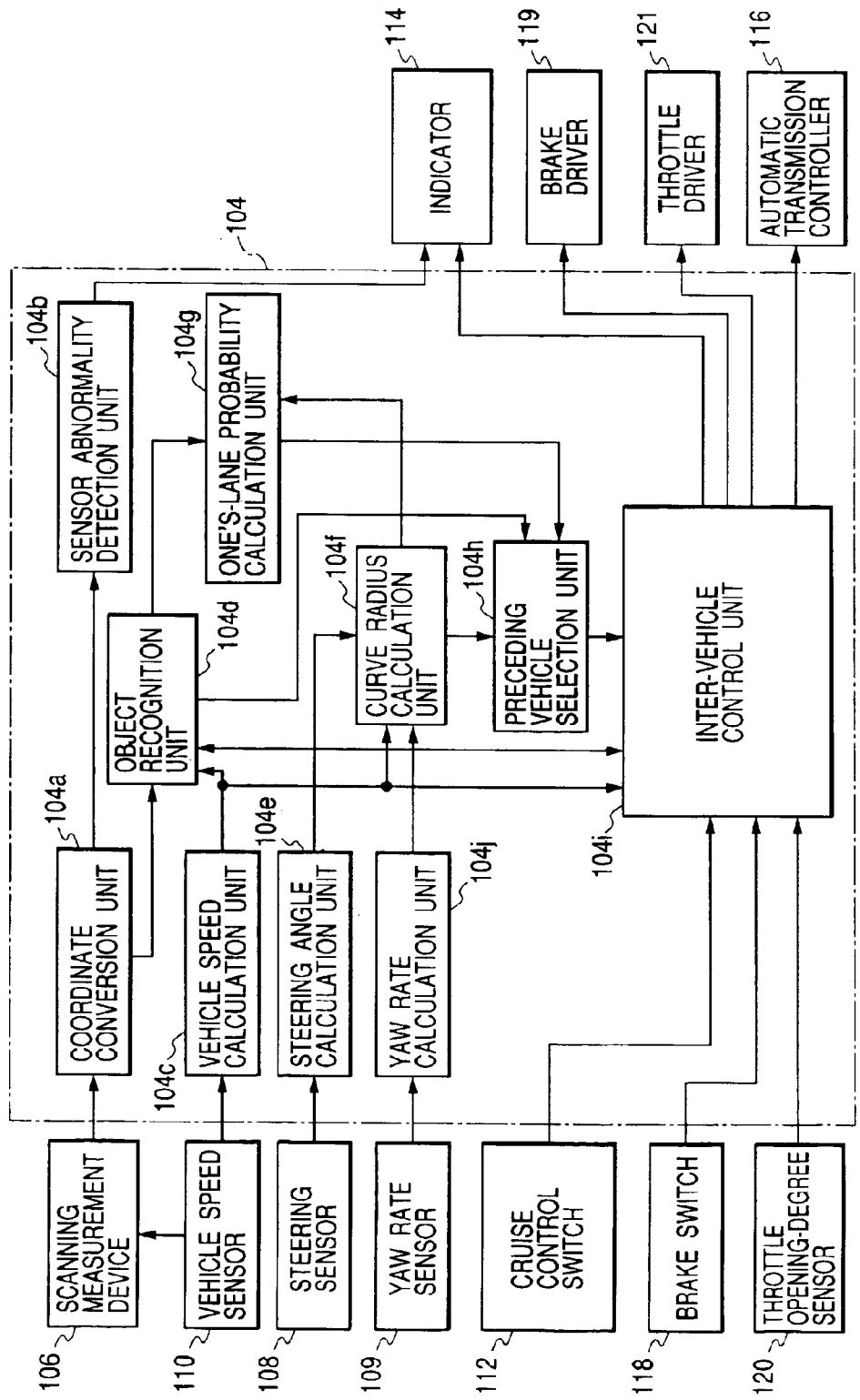
FIG. 17 is a control block diagram showing a computer according to the second embodiment.

FIG. 17 is an illustration of control blocks of the computer 104. The data on a distance and an angle outputted from the scanning measurement device 106 are converted through a coordinate conversion unit 104a into X-Z orthogonal coordinates in a state where the lateral (width) direction of the vehicle is taken as an X axis and the forwarding direction of the vehicle is taken as a Z axis with the center of the scanning measurement device 106 being taken as the origin (0, 0). Moreover, if the value of this conversion result is in an abnormal-range, a sensor abnormality detection unit 104b indicates this fact on the sensor abnormality indicator 114.

An object recognition unit 104d obtains the central position coordinates (X, Z) and size (W, D) of a reflecting object in the forward direction of the one's vehicle on the basis of the distance and angle data converted into the X-Z orthogonal coordinates, and obtains a relative speed (Vx, Vz) of the reflecting object with respect to the position of the one's vehicle on the basis of a variation of the central position (X, Z) on time. Moreover, an assortment recognition on whether the reflecting object is a stopping object or a moving object is made on the basis of a variation of the relative speed (Vx, Vz) with the passage of time, a variation between this relative speed and a vehicle speed Vn of the one's vehicle calculated in a vehicle speed calculation unit 104c, or the like. Incidentally, (W, D) indicative of the size of the reflecting object are (width, depth), respectively.

In addition, a steering angle calculation unit 104e obtains a steering angle on the basis of a signal from the steering sensor 108, and a yaw rate calculation unit 104j calculates a yaw rate on the basis of a signal from the yaw rate sensor 109. A curve radius (radius of curvature) calculation unit 104f calculates a curve radius (radius of curvature) R on the basis of the vehicle speed Vn from the vehicle speed calculation unit 104c, the steering angle from the steering angle calculation unit 104e and the yaw rate from the yaw rate calculation unit 104j.

A one's-lane probability calculation unit 104g calculates a one's-lane probability of a preceding vehicle for each type to be recognized, on the basis of the curve radius R calculated in the curve radius calculation unit 104f, the central position coordinates (X, Z) obtained in the object recognition unit 104d, the size (W, D) of the reflecting object and the relative speed (Vx, Vz).

A preceding vehicle selection unit 104h selects a preceding vehicle for the inter-vehicle distance control on the basis of the one's-lane probability and the Z coordinate of the central position of the reflecting object and obtains the distance Z and the relative speed Vz with respect to that preceding vehicle.

An inter-vehicle control unit 104i outputs control signals for adjusting the inter-vehicle distance relative to the preceding vehicle to the brake driver 119, the throttle driver 121 and the automatic transmission controller 116 on the basis of the distance Z and the relative speed Vz to the preceding vehicle, the one's vehicle speed Vn, the set condition of the cruise control switch 112 and the pressing state of the brake switch 118, and further outputs needed indication signals to the indicator 114 to notify the situation to the vehicle driver.

The inter-vehicle control unit 104i executes the control on the throttle opening degree and the braking through, for example, the following processing. First, a target inter-vehicle distance is calculated as a function of the set condition of the cruise control switch 112 and the vehicle speed Vn. in this embodiment, the target inter-vehicle distance is obtained by multiplying a target inter-vehicle time (for example, 3.0 seconds), set in advance, by the vehicle speed Vn. A target acceleration or deceleration (which will hereinafter be referred to as a "target acceleration/ deceleration") is obtained on the basis of the target inter-vehicle distance, the set condition of the cruise control switch 112 and the distance/relative speed to the preceding vehicle. A target vehicle speed Vm is calculated as a function of the target acceleration/deceleration, the vehicle speed Vn and the set condition of the cruise control switch 112.

On the basis of the target vehicle speed Vm and the actual vehicle speed Vn, a decision is made on a control method, for example, whether the throttle opening degree is to be controlled or not, whether the gear position of the automatic transmission is to be changed or not, or the brake is to be controlled or not. Moreover, on the basis of the control method, the target vehicle speed Vm, the vehicle speed Vn, the set condition of the cruise control switch 112 and the condition of the brake switch 118, the inter-vehicle distance between the one's vehicle and the preceding vehicle is maintained at the target inter-vehicle distance by controlling the throttle opening degree through the use of the throttle driver 121, by controlling the gear position of the automatic transmission through the use of the automatic transmission controller 116, or by controlling the braking pressure through the use of the brake driver 119. Still moreover, the situation is displayed in the indicator 114 in real time.

Figure 18:
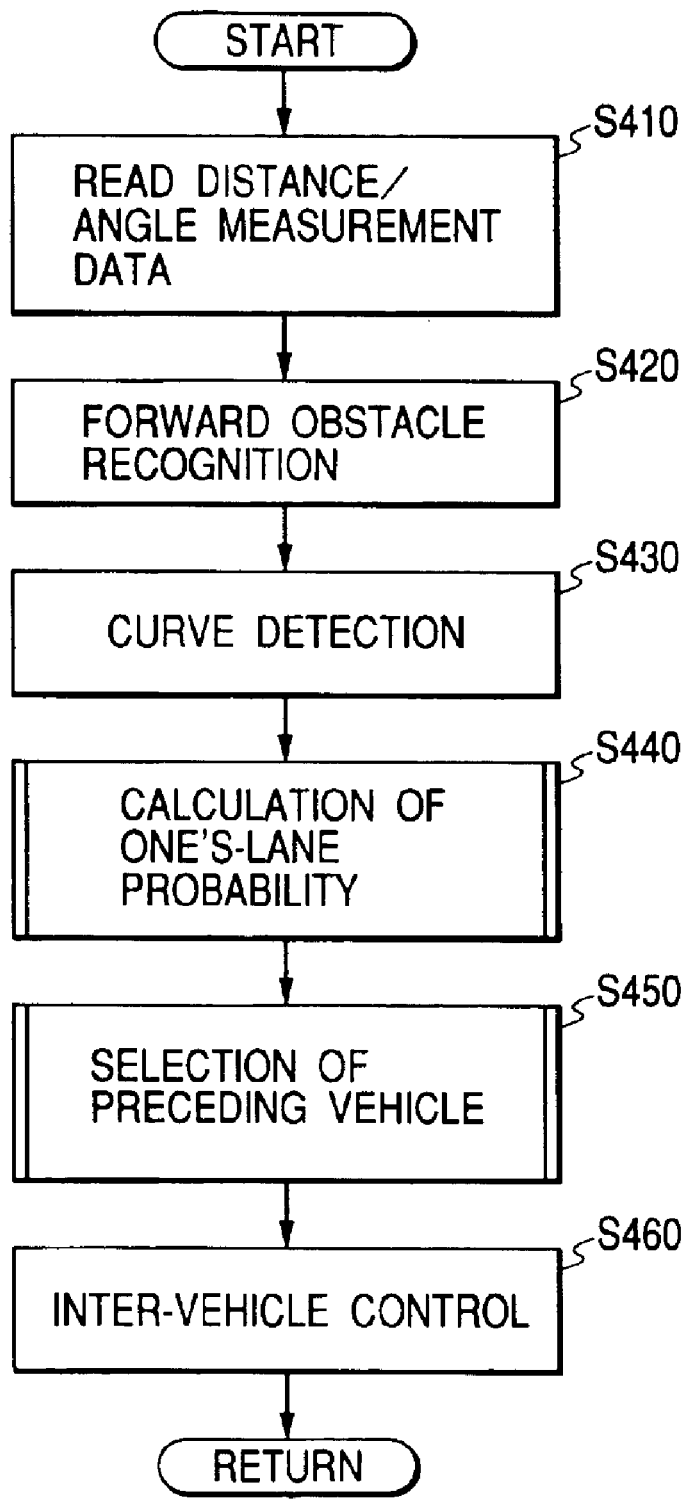
FIG. 18 is a flow chart showing the entire flow of inter-vehicle distance control processing according to the second embodiment.

Secondly, referring to a flow chart of FIG. 18, a description will be given hereinbelow of the inter-vehicle distance control processing. FIG. 18 shows the entire flow of the inter-vehicle distance control processing. This inter-vehicle distance control processing is repeatedly implemented at a control interval of 0.2 second.

First of all, a step S410 is executed to read the measurement data on distance and angle obtained by the scanning measurement device 106, then followed by a step S420 to implement the recognition on an obstacle in the forward direction. The forward obstacle recognition processing in the step S420 obtains the central position coordinates (X, Z), size (W, D) and relative speed (Vx, Vz) of an object existing in the forward direction of the one's vehicle and the recognized assortment on the basis of the vehicle speed Vn of the one's vehicle and a scanning result on the object in the forward direction.

For the assortment recognition, an object can be recognized as a moving object if the relative position of the object scarcely shifts irrespective of the traveling of the one's vehicle. Moreover, an object separating gradually from the one's vehicle can also be recognized as a moving object. On the other hand, when the relative position of an object approaches the one's vehicle at a speed (absolute value) equal to the vehicle speed Vn, the object can be recognized as a stopping object. For example, if the time elapsed from the appearance of an object is too short to make the recognition, that object is recognized as an unidentifiable object. Incidentally, this forward obstacle recognition processing is well known by a person skilled in the art, and the recognition method is not particularly limited.

In addition, the curve detection processing is conducted in a step S430. This curve detection processing is for calculating a radius of curvature (curve radius R) of a road on which the one's vehicle travels, with the calculated curve radius R being used as a correction value for the conversion of the above-mentioned central position coordinates (X, Z) and width W of the object into values to be acquired at the traveling of a straight road in the one's-lane probability calculation processing which will be described later. As the sign of the curve radius, "+" is used for the rightward curve while "−" is used for the leftward curve.

This curve radius R calculation method is also well known by a person skilled in the art, and the detailed description will be omitted for brevity. However, this is not limited to the method in which the curve radius R is calculated as a function of the vehicle speed Vn, the steering angle and the yaw rate. For example, it is also appropriate that the traveling lane in the forward direction of the one's vehicle is picked up by a CCD (Charge Coupled Device) or the like and the traveling lane is recognized from the obtained image to estimate the curve radius R or that, in a case in which provided is a navigation system equipped with a global positioning system (GPS) using a satellite wave, the present position of the one's vehicle is recognized through the use of the GPS to acquire the curve radius R at the present position of the one's vehicle on the basis of map information of the navigation system.

These processing in the steps S410 to S430 provide the data on the central position coordinates (X, Z), size (W, D) and relative speed (Vx, Vz) of the object existing in the forward direction of the one's vehicle and the curve radius R.

In a step S440, the one's-lane probability calculation processing, which will be described later, is implemented to calculate a one's-lane probability P of the object for each recognition assortment, and in a step S450, the preceding vehicle selection processing, which will be mentioned afterward, is executed to select a preceding vehicle for the inter-vehicle distance control. Moreover, in a step S460, as mentioned above, the control is implemented to keep the inter-vehicle distance relative to the selected preceding vehicle at a target inter-vehicle distance.

Figure 19:
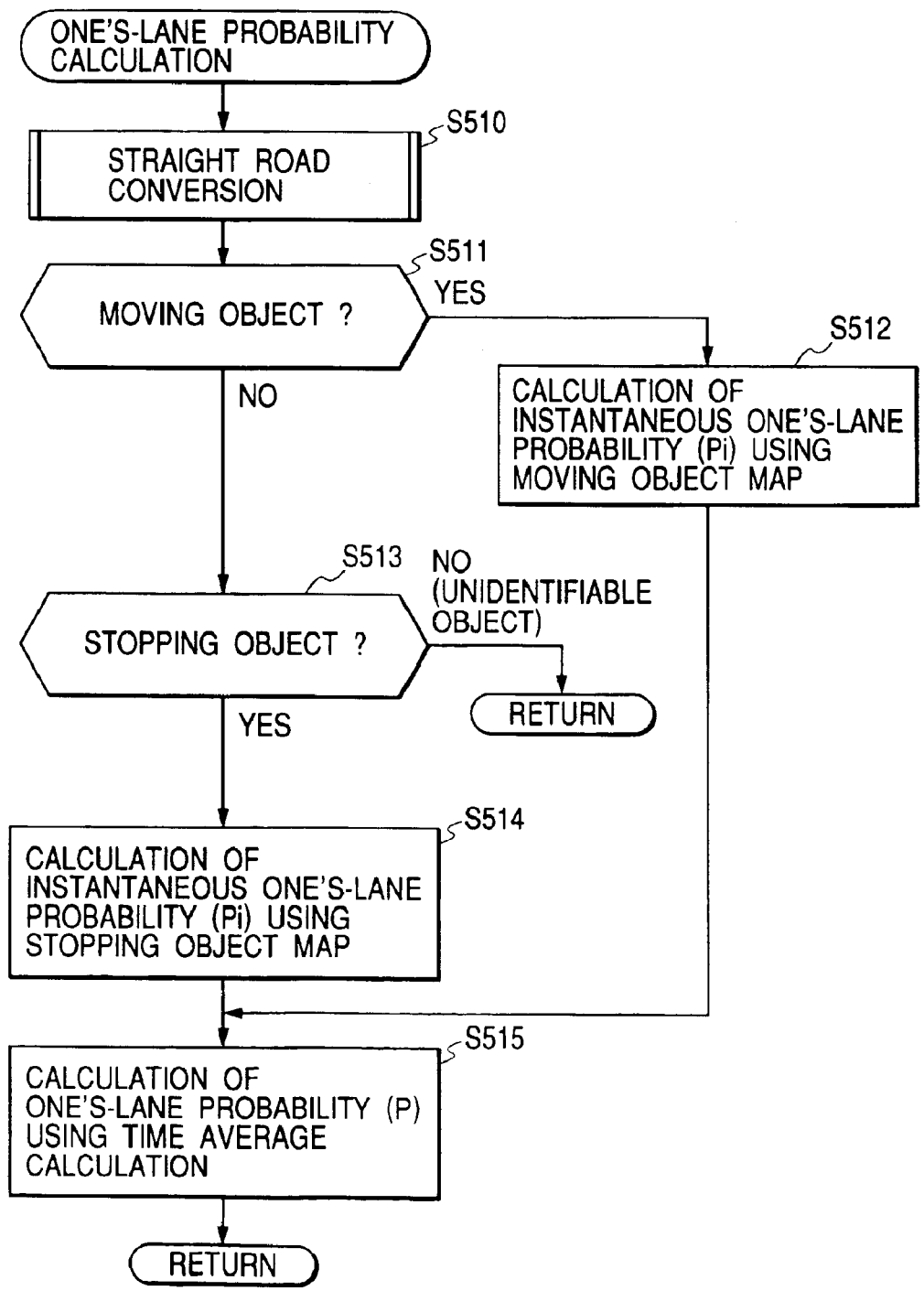
FIG. 19 is a flow chart showing a flow of one's-lane probability calculating processing according to the second embodiment.

Furthermore, referring to a flow chart of FIG. 19, a description will be given hereinbelow of the one's-lane probability calculation processing in the step S440, involving a feature of this embodiment.

First, in a step S510, the central position coordinates (X, Z) and the widths (W) of all the objects obtained in the forward obstacle recognition processing in the step S420 are converted into values to be acquired when the one's vehicle travels on a straight road.

That is, the central position coordinates (X, Z) and width (W) of an object acquired at the traveling of a curved road are converted into values to be acquired in the case of a straight road on the basis of the curve radius R obtained in the curve detection processing in the step S430. Therefore, even if the curve radius R of the road on which the one's vehicle travels varies, the converted central position coordinates and the width of the object for a straight road are attainable through the processing which will be described later.

Figure 20:
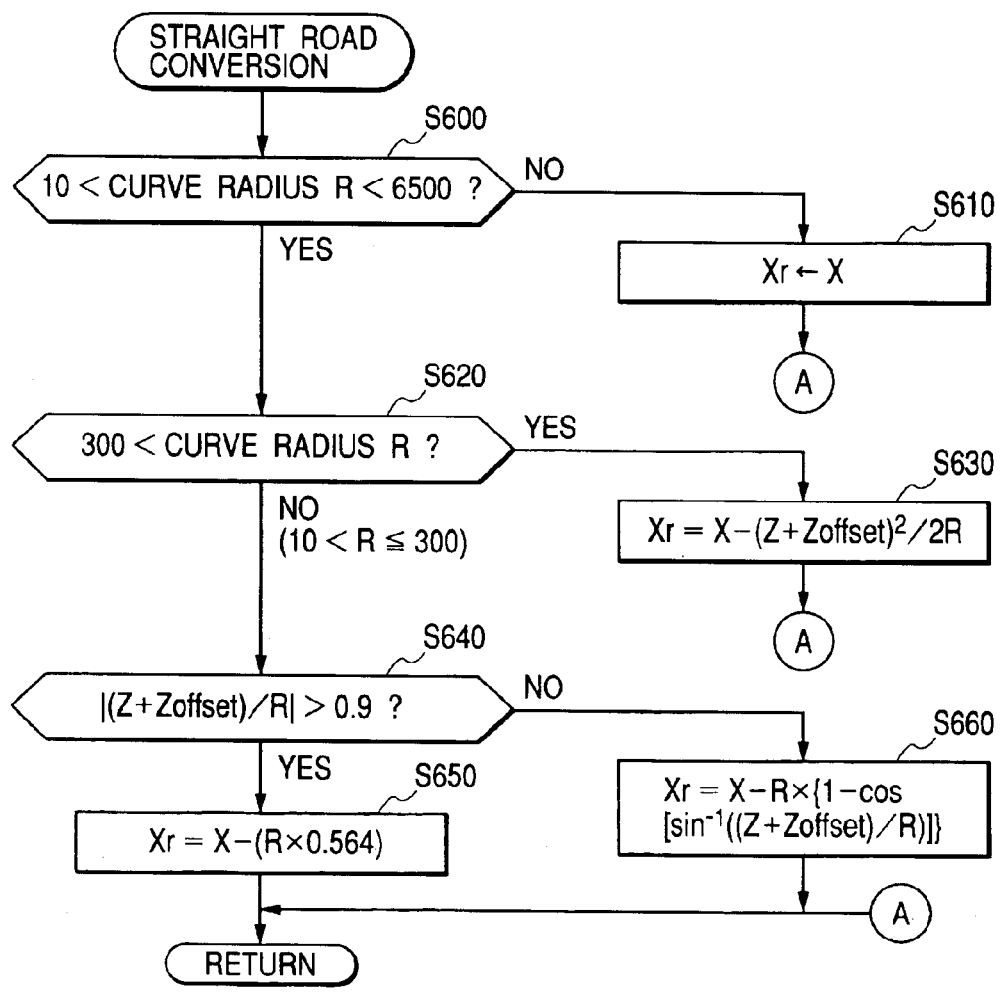
FIG. 20 is a flow chart showing a flow of straight road conversion processing according to the second embodiment.

Referring to a flow chart of FIG. 20, a description will be given hereinbelow of the processing for this conversion into the values in the case of a straight road. In this conversion processing, only the central position coordinate X of an object substantially undergoes the conversion, and the central position coordinate Z and the width W of the object are not handled as an object of conversion.

In a step S600 of FIG. 20, a decision is made as to whether or not the curve radius R obtained in the step S430 of FIG. 18 exceeds 10 m but is below 6500 m. In this case, the signs for the curve radii ("+" for right curve and "−" for left curve) are not taken into consideration. If the decision is affirmative, the operational flow advances to a step S620. On the other hand, if the decision is negative, the operational flow proceeds to a step S610 to substitute the value of X into the central position coordinates Xr after the straight road conversion.

That is, virtually, the conversion of the central position coordinates of an object is not made in the case of the negative decision. This is because, when the curve radius R takes a value extremely close to zero or the curve radius R of a straight road takes infinity, a trouble occurs on the calculation.

In a step S620, a decision is made as to whether or not the curve radius R exceeds 300 m. In the case of the affirmative decision, the operational flow advances to a step S630. On the other hand, for the negative decision, the operational flow goes to a step S640.

Figure 27:
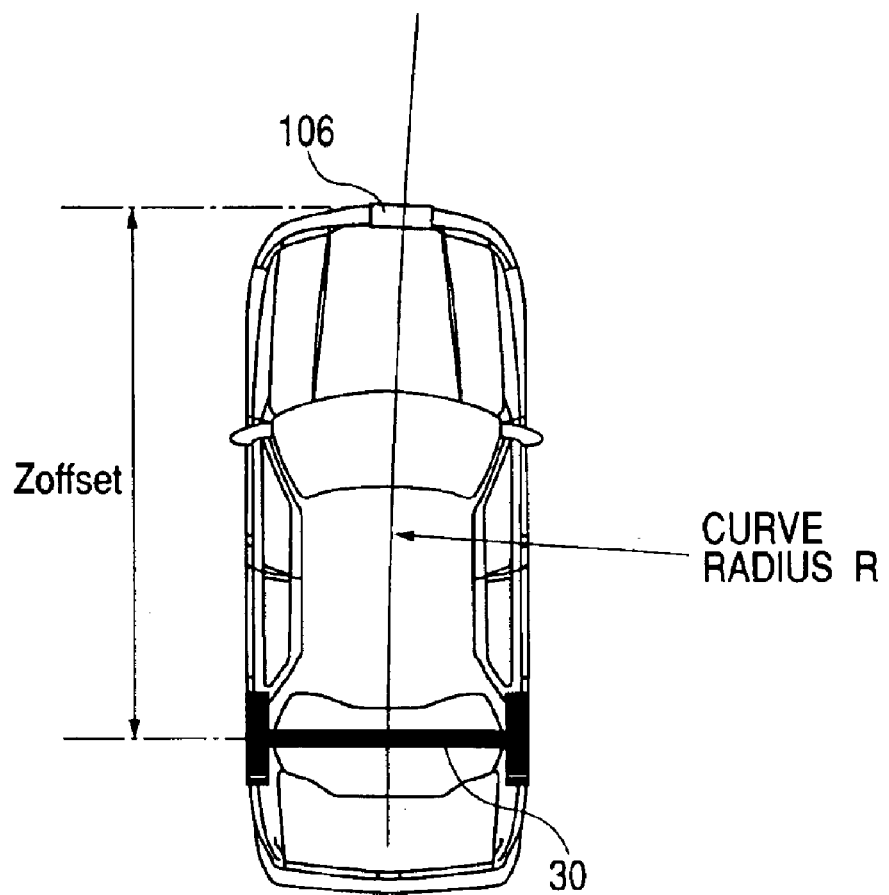
FIG. 27 is an illustration of a distance between a scanning measuring device and a rear-wheel axle shaft according to the second embodiment.

In the step S630, the central position coordinate Xr of the object after the straight road conversion is calculated according to the following equation (8). This equation is derived from an equation on circle whose radius is R.

$$Xr = X - (Z + Zoffset)^2 / 2 \times R \tag{8}$$

where Zoffset signifies the spacing between the rear wheel axle shaft 30 of the one's vehicle and a mounted position of the scanning measurement device 106. That is, as shown in FIG. 27, this equation is derived in a case in which it is considered that the one's vehicle revolves along a circle of the radius R with the rear wheel axle shaft 30 as an axis and, hence, there is a need to substitute the distance corresponding to the spacing between the rear wheel axle shaft of the one's vehicle and the scanning measurement device 106 into the equation.

In a step S640, a decision is made as to whether the ratio between a value obtained by adding Zoffset to the central position coordinate Z and the curve radius R exceeds a predetermined value (0.9). In the case of the affirmative decision, the operational flow advances to a step S650. On the other hand, for the negative decision, the operational flow proceeds to step S660.

In the step S650, the central position coordinate Xr of the object after the straight road conversion is calculated according to the following equation (9). In this equation (9), the coefficient is an approximate value obtained in advance.

$$Xr = X - (R \times 0.564) \tag{9}$$

In the step S660, the central position coordinate Xr of the object after the straight road conversion is calculated according to the following equation (10).

$$Xr = X - R \times \{1 + \cos[\sin^{-1}((Z + Zoffset)/R)]\} \tag{10}$$

In this connection, since the calculation of the equations can require a calculation time which exerts influence on the control cycle, with respect to the term "(Z+Zoffset)/R", a map may be prepared to obtain the value thereof from the values of Z and R.

Thus, in consideration of the magnitude of the curve radius R, the following processing is conducted using the central position coordinates (Xr, Z), size (W, D) and relative speed (Vx, Vz) of the object obtained by the straight road conversion and the recognized assortment (moving object or stopping object).

Referring again to FIG. 19, in a step S511, a decision is made as to whether or not the recognized assortment is a moving object. In the case of the moving object, the operational flow advances to a step S512. On the other hand, for the negative decision, the operational flow proceeds to a step S513.

Figure 22:
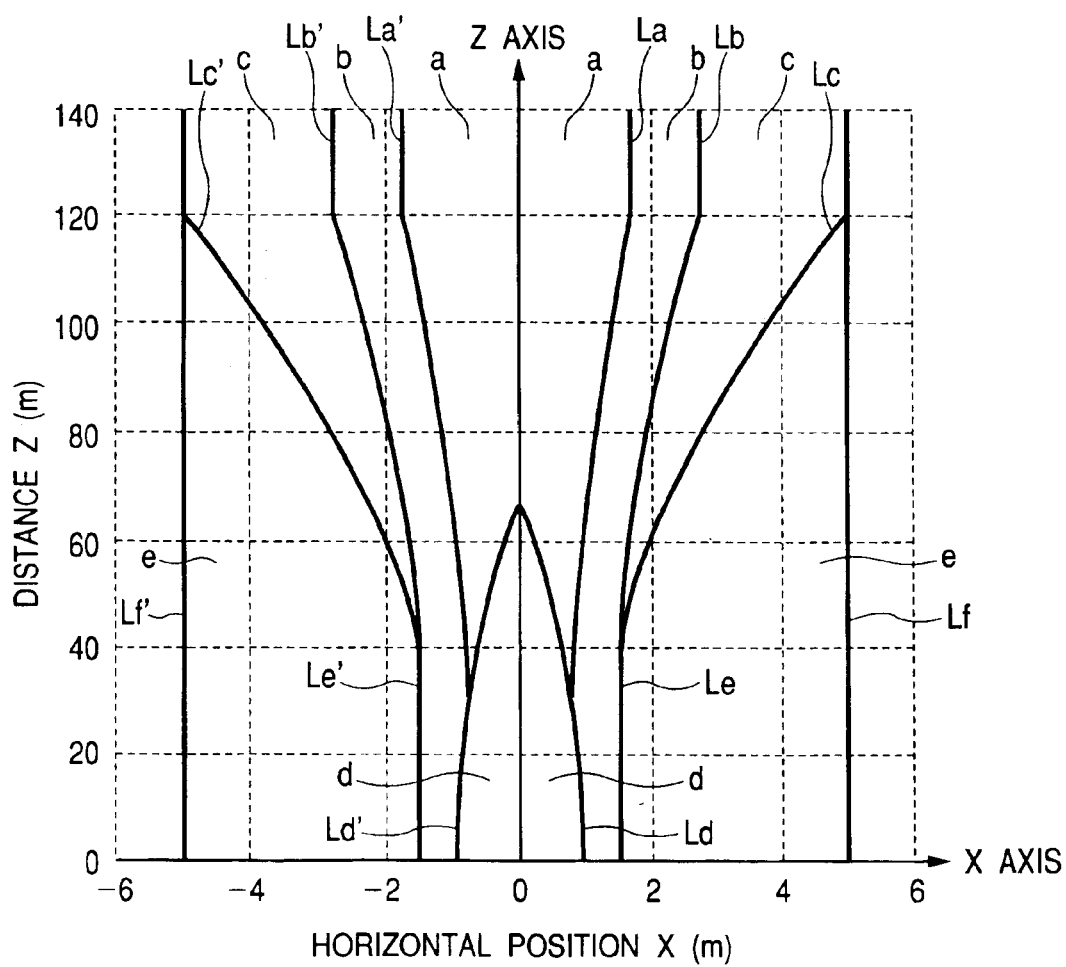
FIG. 22 is an illustration of a one's-lane probability map for a moving object according to the second embodiment.

In the step S512, the central position coordinates (Xr, Z) and width (W) of objects are put on a one's-lane probability map for moving objects shown in FIG. 22 to obtain an instantaneous one's-lane probability of each of the moving objects, i.e., the probability of the existence on the one's lane at that time. This is because, in the curve detection processing, an error exists between the curve radius R obtained on the basis of the steering angle and the yaw rate and the actual curve radius, and the instantaneous one's-lane probability (Pi) on each object is obtained in order to perform the control in consideration of the error therebetween.

In FIG. 22, the X axis is taken as the horizontal axis which indicative of the lateral direction of the one's vehicle, and the Z axis is taken as a vertical axis which is indicative of the forward direction of the one's vehicle. This embodiment shows an area of 5 m in each of right and left directions from the center of the vehicle width and 140 m in the forward direction. This area is divided into an area a (Pi=80%), an area b (Pi=60%), an area c (Pi=30%), an area d (Pi=100%), an area e (Pi=10%), and an area (Pi=0%) other than these areas a to e. This setting of the areas are made through the actual measurement.

For example, border lines La, Lb, Lc, Ld, Le and Lf for the partition into the areas a, b, c, d and e are given by the following equations. In the illustration, the border lines La', Lb', Lc', Ld', Le' and Lf' and the border lines La, Lb, Lc, Ld, Le and Lf are in a symmetrical relationship with respect to the Z axis.

$$La: X = 0.7 + (1.75 - 0.7) \times (Z/120)^2 \tag{11}$$

In the aforesaid equation, if Z exceeds 120 m, X is fixed to 1.75.

$$Lb: X = 1.3 + (2.75 - 1.3) \times (Z/120)^2 \tag{12}$$

In the aforesaid equation, if Z exceeds 120 m, X is fixed to 2.75.

$$Lc: X = 1.0 + (5.0 - 1.0) \times (Z/120)^2 \tag{13}$$

In the aforesaid equation, if Z exceeds 120 m, X is fixed to 2.75.

$$Ld: X=1.0-Z^2/(2\times 2250) \tag{14}$$

$$Le: X=1.5 \tag{15}$$

$$Lf: X=5 \tag{16}$$

In this way, the moving object map for obtaining the probability of the existence of a moving object on the same lane as that of the one's vehicle is made to have a distribution which spreads from the lateral center of the one's vehicle in the right and left directions (horizontal directions) as the distance from the one's vehicle in the forward direction becomes longer, and a lower probability is set in accordance with the spreading from the lateral center of the one's vehicle in the right and left directions. This enables the probability on a preceding vehicle cutting into the one's lane from a remote portion on the right or left lane relative to the one's lane to be set at higher values in a stepwise fashion with the passage of time.

Moreover, in the case of an open road or highway, the width of its lane is approximately 3.0 to 3.5 m. Therefore, when the area of 5 m from the Z axis center in each of the right and left directions is set in the moving object map, the instantaneous one's-lane probability of a preceding vehicle existing on the right or left lane is obtainable in addition to the one's-lane probability. This enables obtaining the instantaneous one's-lane probability on each of objects existing on the right and left lanes but having a possibility of the existence on the same lane as that of the one's lane afterward.

Figures 23, 24:
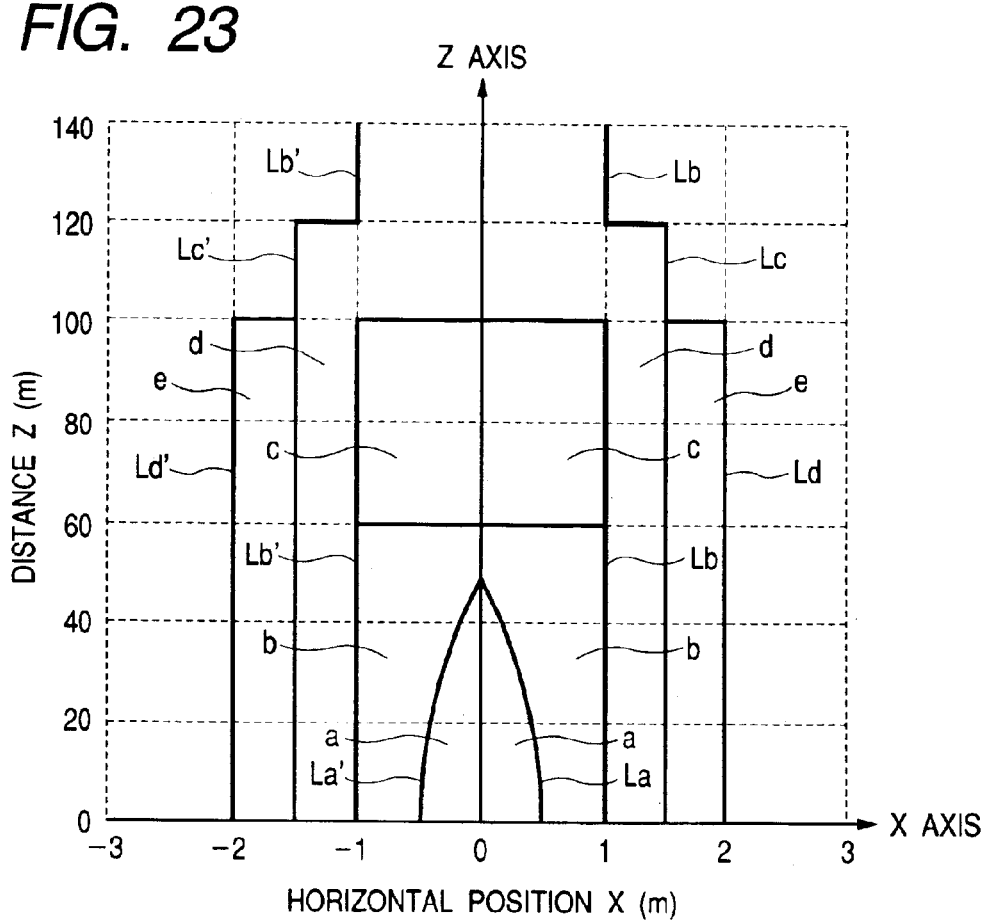
FIG. 23 is an illustration of a one's-lane probability map for a stopping object according to the second embodiment.
FIG. 24 is an illustration of conditions to be taken in obtaining an instantaneous one's-lane probability from the one's-lane probability map for a moving object according to the second embodiment.

In this connection, for the moving object, the instantaneous one's lane probability Pi is determined according to the conditions shown in FIG. 24.

1) a moving object having the area d even if only slightly (Pi=100%)
2) a moving object whose center exist in the area a (Pi=80%)
3) a moving object whose center exists in the area b (Pi=60%)
4) a moving object whose center exists in the area c (Pi=30%)
5) a moving object whose center exists in the area e (Pi=10%)
6) a moving object which does not satisfy 1) to 5) (Pi=0%)

When the instantaneous one's-lane probability Pi on the moving object is finally acquired, the operational flow goes to a step S515.

In the step S513, a decision is made as to whether or not the recognized assortment is a stopping object. If the decision is affirmative, the operational flow advances to a step S514. On the other hand, in the case of the negative decision, since the recognized assortment is an unidentifiable object, the operational flow goes to the step S450 without obtaining the instantaneous one's-lane probability.

In the step S514, the central position coordinates (Xr, Z) and widths (W) of stopping objects are put on the one's-lane probability map for stopping objects to obtain the instantaneous one's-lane probability (Pi) on each of the stopping objects.

In FIG. 23, the X axis is taken as the horizontal axis and the Z axis is taken as the vertical axis indicative of the forward direction of the one's vehicle. This embodiment shows an area of 2 m in each of right and left directions from the center of the vehicle width and 140 m in the forward direction. This area is divided into an area a (Pi=100%), an area b (Pi=80%), an area c (Pi=60%), an area d (Pi=40%), an area e (Pi=10%), and an area (Pi=0%) other than these areas a to e. This setting of the areas are made through the actual measurement.

For example, border lines La, Lb, Lc and Ld for the partition into the areas a, b, c, d and e are given by the following equations. In the illustration, the border lines La', Lb', Lc' and Ld' and the border lines La, Lb, Lc and Ld are in a symmetrical relationship with respect to the center of the Z axis.

$$La: X=0.5-Z^2/(2\times 2250) \tag{17}$$

In this case, Z in the aforesaid equation is a value below 50 m.

$$Lb: X=1 \tag{18}$$

$$Lc: X=1.5 \tag{19}$$

$$Ld: X=2.0 \tag{20}$$

In this way, when the stopping object probability map for obtaining the probability of the existence of a stopping object on the same lane as that of the one's vehicle is set so that the probability decreases with the separation from the one's vehicle in the forward direction and in the right and left directions, the probability of the existence on the same lane as that of the one's vehicle can be set at a high value with respect to only a reflecting object existing in the vicinity of a position immediately before the one's vehicle.

Moreover, since it is considered that the stopping object does not move in principle, when the probability distribution is set in a range of distance which corresponds to approximately the half of the lane width (approximately 3.0 to 3.5 m) of an open road or highway, i.e., in a range of 2 m in each of the right and left directions, it is possible to avoid obtaining the instantaneous one's-lane probability of a stopping object having no possibility of the existence on the same lane as that of the one's vehicle.

In this connection, for the stopping objects, the instantaneous one's-lane probability Pi is determined on the basis of the conditions shown in FIG. 25.

1) a stopping object existing at a Z-axis direction distance from 0 to 50 m in the area a even if only slightly (Pi=100%)
2) a stopping object whose center exists at a Z-axis direction distance from 0 to 60 m in the area b (Pi=80%)
3) a stopping object whose center exists at a Z-axis direction distance from 61 to 100 m in the area c (Pi=60%)
4) a stopping object whose center exists at a Z-axis direction distance from 0 to 140 m in the area d (Pi=40%)
5) a stopping object whose center exists at a Z-axis direction distance from 0 to 100 m in the area e (Pi=10%)
6) a stopping object which does not satisfy the aforesaid 1) to 5) (Pi=0%)

When the instantaneous one's-lane probability for the stopping object is obtained, the operational flow goes to a step S515.

In the step S515, the instantaneous one's-lane probabilities Pi on the respective objects obtained in this way are time-averaged according to the following equation to obtain a one's-lane probability P. Incidentally, the initial value of the one's-lane probability P is set at "0%".

$P$=(last instantaneous one's-lane probability $Pi$×Wave)+(instantaneous one's-lane probability Pix(1−Wave))  (21)

where Wave represents a load average value, and the Wave associated with the value of the central position coordinate Z of an object is extracted as shown in FIG. 26. Thus, through the time average processing, the one's-lane probability P of the object continuously detected is calculated to become high. Moreover, for example, when the weighting increases as the distance from the one's vehicle becomes shorter, the one's-lane probability of an object approaching the one's vehicle is set at a high value. In consequence, the one's-lane probability of a preceding vehicle which exists continuously on the one's lane and approaches the one's vehicle is set at a high value so that it is easily selected as a vehicle for the inter-vehicle distance control in the preceding vehicle selection processing which will be described later.

Figure 21:
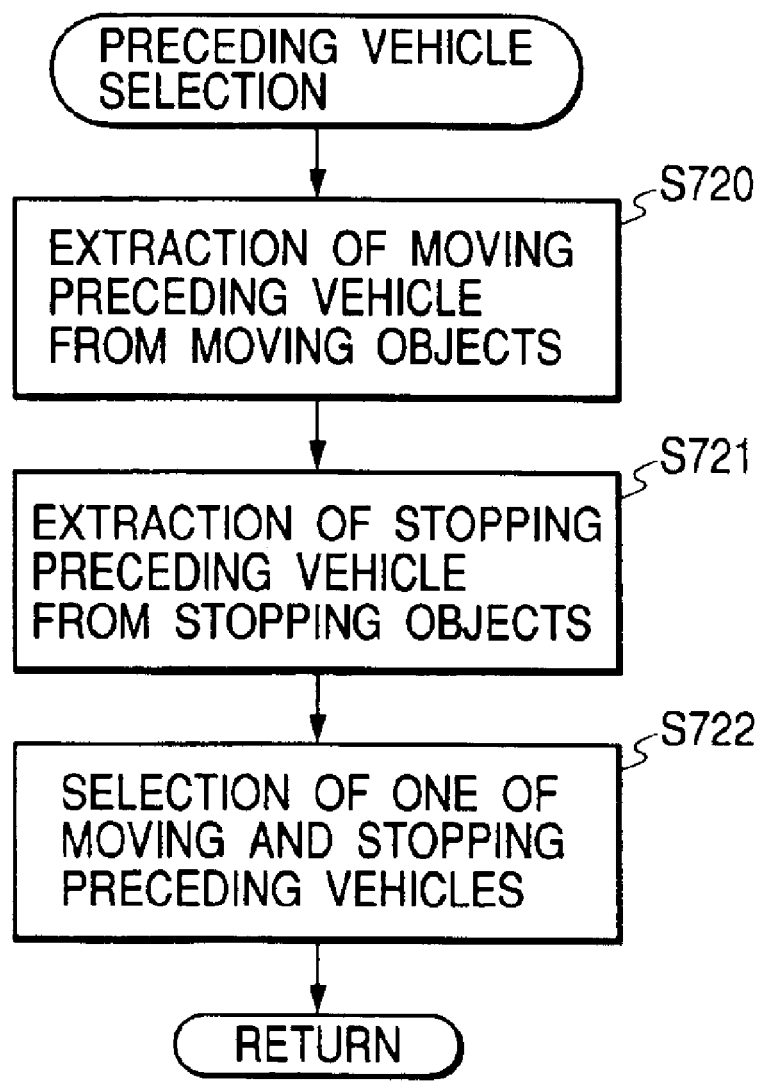
FIG. 21 is a flow chart showing a flow of preceding vehicle selection processing according to the second embodiment.

In this way, the one's-lane probability on each object is obtained in the step S440. Following this, in a step S450, a preceding vehicle is selected from the objects on each of which the one's-lane probability was obtained as mentioned above. Referring to a flow chart of FIG. 21, a description will be given hereinbelow of this preceding vehicle selection processing. This processing is conducted in a state classified into a moving object and a stopping object.

First, in a step S720, all moving preceding vehicles are extracted from the moving objects, and the preceding vehicle having the maximum one's-lane probability P is selected. In this connection, in a case in which a plurality of preceding vehicles are selected, the preceding vehicle having the minimum object central position coordinate Z, i.e., the vehicle closest to the one's vehicle, is finally extracted therefrom. Moreover, in the case of no extraction of a preceding vehicle, this case is handled as no moving preceding vehicle.

Subsequently, in a step S721, all the stopping preceding vehicles are extracted from the stopping objects, and the stopping object having the highest one's-lane probability P is selected as a stopping preceding vehicle. In this connection, in a case in which a plurality of preceding vehicles are selected, the preceding vehicle closest to the one's vehicle is finally extracted therefrom. Moreover, in the case of no extraction of a preceding vehicle, this case is handled as no stopping preceding vehicle.

In a step S722, one preceding vehicle for the inter-vehicle distance control is selected from the extraction results according to the following conditions: that 1) in a case in which both a moving preceding vehicle and a stopping preceding vehicle do not exist, a preceding vehicle is absent;
2) in a case in which any one of a moving preceding vehicle and a stopping preceding vehicle exists, that vehicle is handled as a preceding vehicle for the inter-vehicle distance control; and
3) in a case in which both a moving preceding vehicle and a stopping preceding vehicle exist, the vehicle closer to the one's vehicle is handled as a preceding vehicle for the inter-vehicle distance control.

In a step S460, the inter-vehicle control is implemented with respect to the preceding vehicle selected in this way. Thus, the inter-vehicle distance control can be executed with respect to the preceding vehicle to be inter-vehicle-distance-controlled preferentially.

As described above, in the inter-vehicle distance control unit according to this embodiment, a decision is made as to whether a reflecting object is a moving object or a stopping object, and a probability of the existence of the reflecting object on the same lane as that of the one's vehicle is obtained according to a state of the object so that a reflecting object, i.e., a preceding vehicle, for the inter-vehicle distance control is selected on the basis of this probability. Accordingly, the probability of the existence on the same lane as that of the one's vehicle can be acquired, for example, in consideration of whether the preceding vehicle is moving or stopping.

In addition, since an instantaneous one's-lane probability map for each of the states of the reflecting object is prepared in advance, in a manner such that the relative position of the reflecting object is applied to that map, the probability of the existence on the same lane as that of the one's vehicle can be obtained while making a discrimination between a moving reflecting object and a stopping reflecting object.

It should be understood that the present invention is not limited to the above-described embodiments, and that it is intended to cover all changes and modifications of the embodiments of the invention herein which do not constitute departures from the spirit and scope of the invention.

For example, in the above-described first embodiment, although a margin is given to the tolerance of the mounting angle of the laser radar sensor 5 in both the X- and Y-axis directions and, through the use of a target 100, the recognition region 93 is set to center the laser beam with the highest light-reception intensity therein in the X-axis and Y-axis directions, it is also appropriate that the tolerance of the mounting angle is made smaller with respect to one axis (X axis or Y axis) and the recognition region 93 is set with respect to only the other axis direction through the use of the target 100. Also in this case, as compared with a conventional technique, it is possible to lighten the burden on the adjustment of the mounting angle of the laser radar sensor 5.

In addition, in the above-described first embodiment, although the polygon mirror 73 having different surface inclination angles is used for carrying out the two-dimensional scanning with the laser beam, it is also appropriate to use, for example, a galvano mirror capable of scanning in lateral directions of a vehicle and further to use a mechanism capable of varying the inclination angle of the mirror surface thereof. However, in the case of the polygon mirror 73, there is an advantage in that the two-dimensional scanning is realizable by only the rotational driving.

Still additionally, in the above-described first embodiment, although the distance and the corresponding scan angles θx, θy are converted from the polar coordinates system into the X-Y-Z orthogonal coordinates system in the interior of the laser radar sensor 5, this processing can also be conducted in the object recognition block 43.

Yet additionally, in the above-described first embodiment, although the laser radar sensor 5 using laser beams is employed, it is also acceptable to use a laser radar sensor 5 using an electric wave such as a millimetric wave, an ultrasonic wave, or the like. Moreover, the present invention is not limited to the scanning method, but a method capable of measuring bearing in addition to distances is also acceptable. For example, in the case of the employment of an FMCW radar using a millimetric wave, a Doppler radar or the like, since the information on a distance from a preceding vehicle and information on a relative speed to the preceding vehicle are at once attainable on the basis of a reflected wave (received wave), unlike the case using a laser beam, there is no need to conduct the processing of calculating the relative speed on the basis of the distance information.

What is claimed is:

1. An object recognition apparatus for a vehicle, comprising:

a radar unit capable of emitting a transmission wave throughout a predetermined angular range in vertical and horizontal directions of said vehicle to receive a reflected wave from a reflecting object;

recognition means for recognizing said reflecting object on the basis of a result of the transmission and reception of said waves in said radar unit;

setting means for, on the basis of a result of transmission/reception of a wave relative to a predetermined target in said radar unit, setting an angular range of emission of a transmission wave in at least one of vertical and horizontal directions of said vehicle to an angular range smaller than said predetermined angular range so that, for recognition of said reflecting object, said radar unit emits said transmission wave in the smaller angular range set by said setting means.

2. The apparatus according to claim 1, wherein said predetermined target is a fixed object located at a predetermined distance and at a predetermined height with respect to said vehicle on which said radar unit is mounted.

3. The apparatus according to claim 2, wherein said radar unit is made to emit a plurality of transmission waves in the vertical and horizontal directions of said vehicle, and said setting means sets the smaller angular range so that the transmission wave having an angle at which the reflected wave from said predetermined target shows a maximum reception level is centered in the smaller angular range.

4. The apparatus according to claim 3, wherein a transmission-wave emission angle is set so that the transmission waves adjacent to each other in the vertical direction overlap partially in their boundary region.

5. The apparatus according to claim 3, wherein, when said setting means sets the smaller angular range, said radar unit emits the transmission wave at said target within an angular error margin of the mounting of said radar unit on said vehicle.

6. The apparatus according to claim 3, further comprising calculation means for calculating a central output axis angle of said radar unit on the basis of reception levels of the transmission waves emitted from upper and lower sides with respect to a transmission wave having an angle which provides a maximum reception level.

7. The apparatus according to claim 6, further comprising decision means for making a decision as to whether an output axis of said radar unit takes an upturn or a downturn when said central output axis angle is out of a reference angular range, and in accordance with a downturn or upturn decision in said decision means, said recognition means lowers the probability of said reflecting object being recognized as a vehicle, on the basis of the reflected wave of the transmission wave emitted from an angle on the lower or upper side with respect to the center of the smaller angular range.

8. The apparatus according to claim 6, wherein, when said central output axis angle calculated by said calculation means is a downturned angle with respect to a reference angle, in a case in which detected is only the reflected wave of the transmission wave emitted from the lower side with respect to the transmission wave having said angle which provides the maximum reception level, said recognition means recognizes that said reflecting object is a non-vehicle.

9. The apparatus according to claim 7, further comprising:

estimation means for estimating a central output axis angle of a transmission wave in the vertical direction of said radar unit on the basis of a reflected wave stemming from a reflector of a preceding vehicle satisfying a predetermined condition; and correction means for correcting said central output axis angle calculated by said calculation means when said central output axis angle estimated by said estimation means is shifted from said central output axis angle calculated by said calculation means.

10. The apparatus according to claim 9, wherein, when said preceding vehicle exists in a distance range prescribed by predetermined upper and lower limits, said estimation means estimates said central output axis angle.

11. The apparatus according to claim 9, wherein, when a lateral width of said preceding vehicle falls within a predetermined range, said estimation means estimates said central output axis angle.

12. An inter-vehicle distance control unit comprising:

measurement means for emitting a transmission wave around one's vehicle to detect a distance up to a reflecting object and an emission angle of said transmission wave on the basis of a result of detection of a reflected wave of said transmission wave;

calculation means for calculating a relative position and a relative speed of said reflecting object with respect to said one's vehicle on the basis of said distance and said emission angle detected by said measurement means;

object state decision means for, on the basis of said relative speed calculated by said calculation means, making a decision as to whether said reflecting object is in a moving state or in a stopping state;

one's-lane probability calculating means for changing a probability of the existence of said reflecting object on the same lane as that of said one's vehicle, to be allocated to said reflecting object, on the basis of said relative position calculated by said calculation means in accordance with the moving/stopping state of said reflecting object determined by said object state decision means; and inter-vehicle distance control means for selecting a preceding vehicle for inter-vehicle distance control on the basis of the probability allocated by said one's-lane probability calculating means to control an inter-vehicle distance relative to the selected preceding vehicle.

13. The unit according to claim 12, wherein said one's-lane probability calculating means includes:

a stopping object probability map indicative of a distribution of probability of the existence on the same lane as that of said one's vehicle, associated with said relative position of said reflecting object which takes a stopping state as a decision result in said object state decision means;

a moving object probability map indicative of a distribution of probability of the existence on the same lane as that of said one's vehicle, associated with said relative position of said reflecting object which takes a moving state as a decision result in said object state decision means; and probability detecting means for obtaining a probability of the existence of said reflecting object on the same lane as that of said one's vehicle by applying said relative position, calculated by said calculation means, to said probability map for the state of said reflecting object to which said object state decision means makes a decision.

14. The unit according to claim 13, wherein said stopping object probability map and said moving object probability map prescribes said relative position of said reflecting object on the basis of a distance in a lateral direction of said one's vehicle and a distance in a forward direction of said one's vehicle, and a probability allocation range of said stopping object probability map, in which the probability of the existence on the same lane is allocated, is set to be smaller than a probability allocation range of said moving object probability map in which the probability of the existence on the same lane is allocated.

15. The unit according to claim 13, wherein said stopping object probability map has said probability distribution of a length in a lateral direction corresponding to a width of a lane on which said one's vehicle travels, and said probability distribution is made laterally narrower toward a center in said lateral direction as a distance from said one's vehicle in its forward direction becomes longer after exceeding a predetermined distance, and shows a lower probability as said distance in said forward direction of said one's vehicle becomes longer and a distance from the center of said one's vehicle in said lateral direction becomes longer.

16. The unit according to claim 13, wherein said moving object probability map is set so that said probability distribution is made in a range of a length obtained by adding a lateral length corresponding to widths of right- and left-side lanes relative to said one's vehicle to a lateral length corresponding to a width of a lane on which said one's vehicle travels, and said probability distribution spreads laterally from a center in said lateral direction as a distance from said one's vehicle in its forward direction becomes longer, and the probability becomes lower with the spreading from the center of said one's vehicle in said lateral direction.

17. The unit according to claim 13, wherein said one's-lane probability calculating means includes probability calculating means for calculating a new probability through averaging processing on the basis of the probability calculated the last time and the probability obtained by said probability detecting means.

18. The unit according to claim 17, wherein, in said averaging processing, said probability calculating means changes weighting of the probability calculated the last time and the probability obtained by said probability detecting means in accordance with the distance to said reflecting object detected by said measurement means.

19. The unit according to claim 12, wherein, in selecting a preceding vehicle for inter-vehicle distance control, said inter-vehicle distance control means selects a reflecting object having the highest probability, obtained by said one's-lane probability calculating means, as a preceding vehicle for inter-vehicle distance control.

* * * * *